(12) United States Patent
Redler

(10) Patent No.: US 9,513,095 B2
(45) Date of Patent: Dec. 6, 2016

(54) SYSTEM AND METHOD FOR MEASURING PARAMETERS OF MOTION OF A PROJECTILE AS IT EXITS THE MUZZLE OF A GUN

(76) Inventor: Yesaiahu Redler, Pardesia (IL)

(*) Notice: Subject to any disclaimer, the term of this patent is extended or adjusted under 35 U.S.C. 154(b) by 628 days.

(21) Appl. No.: 13/978,746

(22) PCT Filed: Feb. 8, 2012

(86) PCT No.: PCT/IL2012/000071
§ 371 (c)(1),
(2), (4) Date: Jul. 9, 2013

(87) PCT Pub. No.: WO2012/107926
PCT Pub. Date: Aug. 16, 2012

(65) Prior Publication Data
US 2013/0305819 A1  Nov. 21, 2013

(30) Foreign Application Priority Data
Feb. 9, 2011 (IL) .......................... 211142

(51) Int. Cl.
*G01P 11/00* (2006.01)
*G01L 5/14* (2006.01)
*F42B 15/01* (2006.01)
*F42C 17/04* (2006.01)
*G01P 3/66* (2006.01)

(52) U.S. Cl.
CPC ............... *F42B 15/01* (2013.01); *F42C 17/04* (2013.01); *G01P 3/665* (2013.01)

(58) Field of Classification Search
CPC ............ F42B 15/01; F42C 17/04; G01P 3/665
USPC ............................ 702/149; 244/3.21; 73/167
See application file for complete search history.

(56) References Cited

U.S. PATENT DOCUMENTS

| 5,827,958 A | 10/1998 | Sigler |
| 2006/0060692 A1 | 3/2006 | Yehezkeli et al. |
| 2006/0156804 A1 | 7/2006 | Shipman et al. |
| 2009/0302982 A1* | 12/2009 | Putman .................... F41B 6/00 335/216 |
| 2010/0133374 A1 | 6/2010 | Geswender et al. |
| 2014/0163664 A1* | 6/2014 | Goldsmith ....... A61B 17/00491 623/1.11 |

FOREIGN PATENT DOCUMENTS

KR    10-2009-0061892    6/2009

* cited by examiner

*Primary Examiner* — Gregory J Toatley
*Assistant Examiner* — Eman Alkafawi

(57) ABSTRACT

A system and method for providing information regarding the trajectory of a projectile is disclosed. The system comprises two subsystems: a non-magnetic sleeve designed to fit over the barrel of a gun, with a series of rings of magnetic material disposed thereupon, and an onboard measurement and control system comprising at least one magnetic sensor and control electronics, located within a projectile. As the projectile passes through the sleeve, the magnetic sensors within the projectile produce signals as the projectile passes through the magnetic rings. From the time profile of the signals thus produced, the projectile's linear and angular muzzle velocities are determined.

46 Claims, 9 Drawing Sheets

SYSTEM AND METHOD FOR MEASURING PARAMETERS OF MOTION OF A PROJECTILE AS IT EXITS THE MUZZLE OF A GUN

FIELD OF THE INVENTION

The invention generally relates to means and methods for measuring the linear and angular muzzle velocities and accelerations of projectiles. It relates in particular to methods in which the measurements are made by a magnetic sensors located within the projectile that measures the time-dependent changes in the magnetic field as the projectile passes by magnetic objects in known locations.

CROSS-REFERENCE TO RELATED APPLICATIONS

This application is a U.S. National Phase Application under 35 U.S.C. 371 of PCT International Application No. PCT/IL2012/000071, which has an international filing date of Feb. 8, 2012, and which claims priority from Israel Patent Application No. 211142, filed Feb. 9, 2011, all of which are incorporated herein by reference in their entirety.

BACKGROUND OF THE INVENTION

Current means for delivering mortar and artillery shells suffer from many sources of inaccuracy. Due to inaccuracies of measurement of the size of the propellant charge, specific firing conditions, etc., the precise trajectory of the projectile cannot always be predicted to the desired degree of accuracy. "Smart munitions" devices known in the art are generally based on GPS location systems or on pointing devices. These methods suffer from a number of obvious drawbacks. For example, a GPS signal can easily be jammed, and the use of a pointing device requires a soldier or aircraft to guide the projectile all the way to its target, exposing the soldier to enemy fire and preventing him from performing any other action.

Another approach known in the art is to use one or more sensors to measure the muzzle velocity of the projectile at or near the beginning of its trajectory. From the measurements of the initial velocity (linear and/or angular) and roll state, the exact trajectory can be calculated, and in the case of some non-ballistic projectiles (e.g. those with controllable canards (fins) or means for correcting the roll state), corrected.

Many examples of the use of sensors are known in the art. The technique of placing a plurality of magnetic sensors such as induction coils in the path of a projectile and calculating the projectile's velocity from the time delay between the signals created as the metallic projectile passes by or through the sensor has been known since the 1940's. These systems suffer from the disadvantage that the velocity measurement is performed external to the projectile, and hence any desired corrections to the projectile's trajectory must be broadcast to the projectile, leading to possible problems such as jamming of the signal, using the signal to locate the position of the control center, etc.

These problems can be obviated by, the use of an onboard sensor which measures the motion of the projectile relative to one or more markers or signal generators placed at known positions relative to the muzzle of the gun from which the projectile is fired. A few devices in which an onboard sensor is used to measure the linear muzzle velocity of a projectile at or near the commencement of its trajectory are known.

U.S. Pat. No. 5,827,958 discloses a system in which a projectile contains an onboard magnetic sensor (e.g. an induction coil) and microprocessor, and two external magnets. The magnets may be attached to the gun barrel or to an external muzzle made of non-magnetic material and attached to the mouth of the gun barrel. The microprocessor calculates the muzzle velocity from the time delay between the two signals created as the projectile passes the magnets and the distance between the magnets.

German Pat. No. 3443534 discloses a projectile that contains two magnetic sensors. The time delay between the signals received by the two sensors (e.g. as the projectile exits the barrel of the gun) is measured and the muzzle velocity calculated from the time delay and the distance between the two sensors.

In addition to measurement of linear muzzle velocity, accurate knowledge of the projectile's trajectory depends on knowing its angular velocity and its roll state. A number of patents have disclosed means for measuring these quantities in flight. For example, methods are known in which the variation of the signal produced by a magnetic sensor as the projectile rotates in the earth's magnetic field is measured (e.g. Russian Patent No RU2310154). Other methods are known in which the rotations of the projectile are measured while the projectile is in flight; see, for example U.S. Pat. Nos. 5,497,704 and 7,341,221. U.S. Pat. No. 5,065,956 measures the angular velocity of a projectile using an onboard magnet sensor that compares measurements of the actual change in the magnetic field as the projectile rotates with measurements of a nominal fixed rotation.

Means for measuring the angular muzzle velocity and roll state of the projectile at the beginning of its trajectory (i.e. as it exits the muzzle) are less commonly disclosed. U.S. Pat. No. 5,233,901 discloses a method for determining the roll state of a projectile as it leaves the barrel of a gun. In this method, the projectile contains a magnet with its poles at a known angle (e.g. perpendicular) to the axis of motion of the projectile. Two windings are placed at the end of the barrel, with the windings perpendicular to one another. The roll state of the projectile as it exits the barrel is determined from the timing and phase of the signals produced as the magnet passes through the windings. The system disclosed in the patent includes the use of comparators to find the maximum signal received by each of the coils. The use of comparators can be problematic; for example, a broad but noisy peak may lead to a false calculation of the correct time at which the maximum signal was obtained. This method suffers from the additional disadvantage discussed above of depending on a signal that is produced externally to the projectile.

Thus, a system and method for determining both the linear and the angular muzzle velocities and the roll state of a projectile as it exits the muzzle of the gun from which it is fired in which the determination of these parameters is performed entirely onboard and is hence not susceptible to external interference and does not require any kind of external guidance, remains a long-felt yet unmet need.

SUMMARY OF THE INVENTION

The invention disclosed herein is designed to meet this need in a manner that overcomes the problems of systems known in the prior art. The invention comprises a system and method for onboard determination of a projectile's linear and angular velocities at the beginning of its flight. A non-magnetic sleeve is placed at the muzzle end of a gun; a magnetic sensor (e.g. an Anisotropic Magnetoresistive (AMR) sensor) on board the projectile measures signals arising from magnetic material attached to or embedded in the sleeve. From the signals obtained by the magnetic sensor, parameters of the projectile's motion as it exits the muzzle of the gun, for example, linear and angular velocities and accelerations, can be determined.

It is therefore an object of this invention to disclose a system for determining parameters of the motion of a projectile as it exits the muzzle of a gun barrel, wherein said system comprises: (1) a projectile; (2) p magnetic sensors, p≥1, located within said projectile, each of which is displaced from the longitudinal axis of said projectile by a distance $r_p$; (3) a microprocessor located within said projectile, said microprocessor in electrical communication with said at least one magnetic sensor, said microprocessor comprising a timing circuit, a logic circuit, and data storage means, and being programmed to measure the relative timing of signals received from said at least one magnetic sensor and to calculate at least one parameter related to the motion of said projectile; (4) a gun barrel from which said projectile is expelled; (5) a sleeve, constructed of non-magnetic material, extending from the mouth of said gun barrel and disposed such that the longitudinal axis of said sleeve is coincident with the longitudinal axis of said gun barrel; (6) a first horizontal ring, constructed of magnetic material, disposed about the circumference of said sleeve such that the plane defined by the ring is perpendicular to the longitudinal axis of said sleeve and located beyond the mouth of said gun barrel; (7) a second horizontal ring, constructed of magnetic material, disposed about the circumference of said sleeve such that the plane defined by the ring is perpendicular to the longitudinal axis of said sleeve and displaced from said first horizontal ring by a distance $D_1$ measured parallel to the longitudinal axis of said sleeve; and (8) a plurality n of oblique rings disposed about the circumference of said sleeve with a helix angle θ and a separation between two successive oblique rings m and m+1 (1≤m≤n−1) of $\Delta D_m$, the point on said plurality of oblique rings closest to the mouth of said gun barrel separated by a distance $D_2$ from said first horizontal ring ($D_2$>$D_1$), $D_2$ and $\Delta D_m$ being measured parallel to the longitudinal axis of said sleeve.

It is a further object of this invention to disclose such a system, wherein said magnetic sensor is chosen from the group consisting of Anisotropic Magnetoresistive (AMR) sensors.

It is a further object of this invention to disclose such a system, wherein said microprocessor is additionally programmed to analyze the form of said signals as a function of time and to extract signal peaks from analysis of said form.

It is a further object of this invention to disclose such a system, wherein said at least one parameter related to the motion of said projectile is chosen from the group consisting of linear velocity, angular velocity, roll state, linear acceleration, angular acceleration, and any combination of the above.

It is a further object of this invention to disclose such a system, further comprising communications means, data transfer means, and means for storage of data received by said communications means, said means for storage of data received by said communications means in logical connection with said microprocessor, whereby externally supplied data is accepted and stored.

It is a further object of this invention to disclose such a system, wherein said communications means are chosen from the group consisting of wired communication, contactless RF, optical communications means, and magnetic communications means.

It is a further object of this invention to disclose such a system, wherein said externally supplied data is chosen from the group consisting of the amount of charge; location of said gun barrel; azimuth; attitude; target location; expected target range; magnetic grid type; parameters related to current weather conditions; parameters related to predicted future weather conditions; parameters related to climate; and any combination of the above.

It is a further object of this invention to disclose such a system, further comprising a magnetic reed switch disposed within said projectile such that at least one of said data storage means, said communications means, said data transfer means, and said means for storage of data received by said communications means is in electrical connection with its power source only after said projectile has passed close enough to a source of an external magnetic field sufficiently strong to activate said magnetic reed switch.

It is a further object of this invention to disclose such a system, wherein said sleeve is constructed of non-magnetic mesh.

It is a further object of this invention to disclose such a system, wherein at least one of said rings is constructed of magnetic Neodymium-Iron-Boron alloy.

It is a further object of this invention to disclose such a system, wherein 5 mm≤$D_1$≤300 mm.

It is a further object of this invention to disclose such a system, 40 mm≤D≤150 mm.

It is a further object of this invention to disclose such a system, wherein said plurality of third oblique rings comprises a single helical coil comprising at least two complete turns around the circumference of said sleeve.

It is a further object of this invention to disclose such a system, wherein θ is between 1° and 89°.

It is a further object of this invention to disclose such a system, wherein θ is between 5° and 45°.

It is a further object of this invention to disclose such a system, wherein 5 mm≤$\Delta D_m$≤300 mm for all values of m.

It is a further object of this invention to disclose such a system, wherein 30 mm≤$\Delta D_m$≤200 mm for all values of m.

It is a further object of this invention to disclose such a system, wherein 5 mm≤$D_2$≤300 mm.

It is a further object of this invention to disclose such a system, wherein 30 mm≤$D_2$≤200 mm.

It is a further object of this invention to disclose such a system, wherein n=2.

It is a further object of this invention to disclose such a system, wherein n=3.

It is, a further object of this invention to disclose such a system, wherein n>2 and $\Delta D_m$=ΔD for all values of m.

It is a further object of this invention to disclose such a system, further comprising a third horizontal ring constructed of magnetic material, disposed about the circumference of said sleeve such that the plane defined by said third horizontal ring is perpendicular to the longitudinal axis of said sleeve and displaced from said first horizontal ring by a distance $D_4$ as measured parallel to the longitudinal axis of said sleeve, wherein $D_4$>$D_1$.

It is a further object of this invention to disclose such a system, wherein $D_4$ is between a few millimeters and large enough to resolve the accuracy required.

It is a further object of this invention to disclose such a system, further comprising at least one additional horizontal ring constructed of magnetic material, disposed about the circumference of said sleeve such that the plane defined by each of said additional horizontal rings is perpendicular to the longitudinal axis of said sleeve.

It is a further object of this invention to disclose such a system, wherein $$D_A > D_2 + \sum_m \Delta D_m.$$

It is a further object of this invention to disclose such a system, wherein said sleeve and said gun barrel further comprise a guide system chosen from (a) at least one matching tab and notch, (b) at least one pair of matching marks, and (c) any combination of the above such that proper alignment of said guide system fixes the rotational orientation of said sleeve relative to the longitudinal axis of said gun barrel.

It is a further object of this invention to disclose such a system, further comprising a parameter entry system, said parameter entry system comprising two rings constructed of magnetic material, disposed about the circumference of said sleeve such that the plane defined by each ring is perpendicular to the longitudinal axis of said sleeve and separated by a preset distance $D_P$ as measured parallel to the longitudinal axis of said sleeve and further from the mouth of said gun barrel than the last of said oblique rings, wherein the value of $D_P$ correlates with at, least one predetermined parameter to a predetermined protocol.

It is a further object of this invention to disclose such a system, wherein said predetermined parameter is chosen from the group consisting of elevation, azimuth, distance to target, target latitude, target, longitude, target elevation, amount of charge, and any combination of the above.

It is a further object of this invention to disclose such a system, further comprising at least one device responsive to acceleration, said device disposed within said projectile and in electrical communication with said microprocessor.

It is a further object of this invention to disclose such a system, wherein each of said devices is chosen from the group consisting of accelerometer, optical G-switch, and mechanical G-switch.

It is a further object of this invention to disclose such a system, wherein said projectile further comprises drag control means, said drag control means comprising (a) a reversibly openable iris; (b) means for opening and closing said iris, said means disposed within said projectile and in mechanical connection with said iris; and (c) control means for controlling, according to a predetermined protocol, the degree to which said iris is opened, said control means in logical connection with said means for opening and closing said iris.

It is a further object of this invention to disclose such a system, wherein said projectile further comprises a secondary charge.

It is a further object of this invention to disclose such a system, wherein said projectile further comprises an inertial navigation system, said inertial navigation system comprising at least one gyroscope; at least one accelerometer in electrical connection with said microprocessor; and at least one additional magnetic sensor in electrical connection with said microprocessor. It is within the essence of the invention wherein said microprocessor is further programmed to get signals and data and to provide control signals to said inertial navigation system in response to signals received by said microprocessor, whereby the trajectory of said projectile.

It is a further object of this invention to disclose such a system, wherein said projectile comprises a plurality of fins, and said inertial navigation system further comprises a power source and servo system for controlling the orientation of each of said fins.

It is a further object of this invention to disclose such a system, wherein said microprocessor is further programmed to activate a predetermined subset of the onboard components only when the acceleration of said projectile falls below a predetermined value.

It is a further object of this invention to disclose such a system as defined in any of the above, wherein said projectile further comprises RF shielding disposed to protect components disposed within said projectile from interference by external RF signals.

It is a further object of this invention to disclose such a system, wherein said RF shielding is constructed of non-magnetic material.

It is a further object of this invention to disclose such a system, wherein said RF shielding is constructed of stainless steel.

It is a further object of this invention to disclose such a system as defined in any of the above, wherein p=1.

It is a further object of this invention to disclose such a system as defined in any of the above, wherein said microprocessor is further programmed to test a predetermined subset of the components of the system to determine that said components are operating properly.

It is a further object of this invention to disclose a method for determining the values of parameters related to the linear and angular motions of a projectile exiting a gun barrel, comprising: (a) obtaining a system as defined in any of the above; (b) firing said projectile; (c) determining the time $t_0$ at which said projectile passes through said first horizontal ring; (d) determining the time $t_1$ at which said projectile passes through said second horizontal ring; (e) calculating the linear muzzle velocity V of said projectile; (f) calculating the time $t_2$ at which said projectile passes through distance $D_2$; (g) determining the time $t_3$ at which said magnetic sensor crosses the first of said plurality of oblique rings; (h) defining a reference point $P_1$ along the circumference of said sleeve; (i) determining the crossing point $P_2$ on the first of said oblique rings; (j) calculating a chord $Y_1$, wherein $Y_1$ is defined as the distance, measured in a plane containing point $P_2$ and perpendicular to the longitudinal axis of said sleeve, between $P_2$ and the intersection of a perpendicular drawn from $P_1$ to said plane; (k) calculating roll state angle $\phi_1$ subtended by said chord $Y_1$; (l) calculating the time $t_4$ at which said projectile passes through distance $D_2+\Delta D_m$ for a predetermined integral value of m, $1 \leq m \leq n-1$; (m) determining the time $t_5$ at which said magnetic sensor crosses the (m+1)th of said oblique rings; (n) defining a reference point $P_3$ along the circumference of said sleeve, wherein the angle between $P_3$ and $P_1$ with respect to the longitudinal axis of said sleeve is $\zeta$; (o) determining the crossing point $P_4$ on said (m+1)th of said oblique rings; (p) calculating a chord $Y_2$, wherein $Y_2$ is defined as the distance, measured in a plane containing point $P_4$ and perpendicular to the longitudinal axis of said sleeve, between $P_4$ and the intersection of a perpendicular drawn from $P_3$ to said plane; (q) calculating roll state angle $\phi_2$ subtended by said chord $Y_2$; and (r) calculating the angular velocity $V_{ang}$ of said projectile.

It is a further object of this invention to disclose such a method, further comprising steps of (a) obtaining a system as defined in any of the above wherein m>2; (b) calculating the time $t_{4m}$ at which said projectile passes through distance $D_2+\Delta D_m$ for a predetermined integral value of m≤n; (c) determining the time $t_{5m}$ at which said magnetic sensor crosses the mth oblique ring; (d) defining a reference point $P_{3m}$ along the circumference of said sleeve, wherein the angle between $P_{3m}$ and $P_1$ with respect to the circumference of said sleeve is $\zeta$; (e) determining the crossing point $P_{4m}$ on said mth oblique ring; (f) calculating a chord $Y_{2m}$, wherein $Y_{2m}$ is defined as the distance, measured in a plane containing point $P_{4m}$ and perpendicular to the longitudinal axis of said sleeve, between $P_{4m}$ and the intersection of a perpendicular drawn from $P_{3m}$ to said plane; (g) calculating roll state angle $\phi_2$ subtended by said chord $Y_{2m}$; and (h) calculating the angular velocity $V_{ang}$ of said projectile.

It is a further object of this invention to disclose such a method, wherein $\zeta=0$.

It is a further object of this invention to disclose such a method, wherein p>1 and further comprising a step of carrying out each of the steps said method independently for each of said p magnetic sensors.

It is a further object of this invention to disclose such a method, further comprising a step of performing a redundancy check by using said microprocessor to compare the p values obtained for V and for $V_{ang}$.

It is a further object of this invention to disclose such a method, further comprising steps of averaging at least a subset of the p values obtained for V and for $V_{ang}$; and defining the averages thus obtained to be the nominal values of V and $V_{ang}$.

It is a further object of this invention to disclose such a method as defined in any of the above, further comprising steps of defining $r_{ring}$ as the radius of the oblique rings; defining $D_3$ as the distance, measured along the longitudinal axis of said sleeve, between points $P_1$ and $P_2$; defining $D_4$ as the distance, measured along the longitudinal axis of said sleeve, between said first horizontal ring and point $P_3$; and defining $D_5$ as the distance, measured along the longitudinal axis of said sleeve, between points $P_3$ and $P_4$, wherein said step of calculating V further includes a step of calculating V from the relation $$V = \frac{D_1}{t_1 - t_0};$$

said step of calculating $Y_1$ further includes a step of calculating $Y_1$ from the relation $$Y_1 = \frac{D_3}{\tan\theta};$$

said step of calculating $\phi_1$ further includes a step of calculating $\phi_1$ from the relation $$\varphi_1 = \cos^{-1}\left[\left(\frac{Y_1}{2r_{ring}}\right)^2 + 1\right];$$

said step of calculating $Y_2$ further includes a step of calculating $Y_2$ from the relation $$Y_2 = \frac{D_5}{\tan\theta};$$

said step of calculating $\phi_2$ further includes a step of calculating $\phi_1$ from the relation $$\varphi_2 = \cos^{-1}\left[\left(\frac{Y_2}{2r_{ring}}\right)^2 + 1\right];$$

and said step of calculating the angular velocity further includes a step of calculating the angular velocity from the relation $$V_{ang} = \frac{\varphi_2 - \varphi_1 + \zeta}{t_5 - t_3}.$$

It is a further object of this invention to disclose such a method, wherein said step of calculating the time $t_2$ at which said projectile passes through distance $D_2$ further includes a step of calculating $t_2$ from the relation $D_2=V(t_2-t_0)$, and further comprising a step of calculating the distance $D_3$ from the relation $D_3=V(t_3-t_2)$.

It is a further object of this invention to disclose such a method, wherein said step of calculating the time $t_4$ at which said projectile passes through distance $D_4$ further includes a step of calculating $t_4$ from the relation $D_4=V(t_4-t_0)$, and further comprising a step of calculating the distance $D_5$ from the relation $D_5=V(t_5-t_4)$.

It is a further object of this invention to disclose such a method, further comprising steps of (a) disposing a third horizontal ring constructed of magnetic material about the circumference of said sleeve such that the plane defined by said third horizontal ring is perpendicular to the longitudinal axis of said sleeve and displaced from said first horizontal ring by a distance $D_A$ as measured along the longitudinal axis of said sleeve; (b) determining the time $t_A$ at which said magnetic sensor crosses said third horizontal ring; and (c) determining the linear acceleration A of said projectile.

It is a further object of this invention to disclose such a method, further comprising steps of (a) disposing a third horizontal ring constructed of magnetic material about the circumference of said sleeve such that the plane defined by said third horizontal ring is perpendicular to the longitudinal axis of said sleeve and displaced from said first horizontal ring by a distance $D_A$ as measured along the longitudinal axis of said sleeve; (b) determining the time $t_A$ at which said magnetic sensor crosses said third horizontal ring; (c) calculating V' from the relation $$V' = \frac{D_A}{t_A - t_1};$$

and (d) determining the linear acceleration A of said projectile from the relation $$A = \frac{V' - V}{t_A - t_0}.$$

It is a further object of this invention to disclose such a method, further comprising steps of (a) calculating the time $t_{4m}'$ at which said projectile passes through distance $D_2+\Delta D_{m'}$, m<m'<n−2; (b) determining the time $t_{5m}'$ at which said magnetic sensor crosses the (m')th oblique ring; (c) defining a reference point $P_{3m}'$ along the circumference of said sleeve, wherein the angle between $P_{3m}'$ and $P_1$ with respect to the circumference of said sleeve is $\zeta'$; (d) determining the crossing point $P_{4m}'$ on said (m')th oblique ring;

(e) calculating a chord $Y_{2m}'$, wherein $Y_{2m}'$ is defined as the distance, measured in a plane containing point $P_{4m}'$ and perpendicular to the longitudinal axis of said sleeve, between $P_{4m}'$ and the intersection of a perpendicular drawn from $P_{3m}'$ to said plane; (f) calculating roll state angle $\phi_3$ subtended by said chord $Y_{2m}'$; and (g) calculating the angular acceleration $A_{ang}$ of said projectile.

It is a further object of this invention to disclose such a method, further comprising a step of calculating $$V'_{ang} = \frac{\varphi_3 - \varphi_2}{t'_{5m} - t_5},$$

wherein said step of calculating the angular acceleration $A_{ang}$ further comprises a step of calculating $A_{ang}$ from the relation $$A_{ang} = \frac{V'_{ang} - V_{ang}}{t'_{5m} - t_3}.$$

It is a further object of this invention to disclose such a method, further comprising a step of waiting for a period of time of not less than $t_{wait}$ after said step of determining $t_2$ before performing said step of determining $t_5$, wherein $$t_{wait} = \frac{2r_{ring}\tan\theta}{V}.$$

It is a further object of this invention to disclose such a method, further comprising steps of obtaining a projectile further comprising a plurality of fins; and obtaining an inertial navigation system further comprising a power source and servo system for controlling the orientation of each of said fins. It is within the essence of the invention wherein said step of directing the inertial navigation system to correct the trajectory of said projectile in response to the values of V and $V_{ang}$ further comprises a step of using said servo system to control the orientation of each of said fins in order to correct the trajectory of said projectile.

It is a further object of this invention to disclose such a method, further comprising a step of activating a predetermined subset of the onboard components only when the acceleration of said projectile falls below a predetermined value.

It is a further object of this invention to disclose such a method, further comprising steps of (a) disposing two rings constructed of magnetic material about the circumference of said sleeve such that the plane defined by the ring is perpendicular to the longitudinal axis of said sleeve and located beyond the mouth of said gun barrel, said two rings separated by a distance $D_P$ as measured parallel to the longitudinal axis of said sleeve and disposed about said sleeve further from the mouth of said gun barrel than the furthest of said oblique rings; (b) setting $D_P$ to a value correlating with a predetermined parameter according to a predetermined protocol; (c) determining the time $t_p$ for said magnetic sensor to traverse said two rings; (d) calculating $D_P$ from the relation $$D_P = \frac{V}{t_P};$$

and (e) determining the value of said parameter according to said predetermined protocol.

It is a further object of this invention to disclose such a method, wherein said parameter is chosen from the group consisting of elevation, azimuth, distance to target, target latitude, target longitude, target elevation, amount of charge, and any combination of the above.

It is a further object of this invention to disclose such a method, further comprising steps of (a) obtaining an inertial navigation system as defined above; (b) disposing said inertial navigation system within said projectile such that said inertial navigation system can be used to direct the navigation of said projectile; (c) using the navigation software of said inertial navigation system to combine the preloaded parameters with the, muzzle angular position, the linear velocity V and the angular velocity $V_{ang}$; and (d) directing the inertial navigation software system to correct the trajectory of said projectile in response to the values inserted and/or measured.

It is a further object of this invention to disclose such a method, further comprising steps of (a) supplying data from an external source to said microprocessor; and (b) storing said externally supplied data.

It is a further object of this invention to disclose such a method, wherein said externally supplied data is chosen from the group consisting of the amount of charge; location of said gun barrel; azimuth; attitude; target location; expected target range; magnetic grid type; parameters related to current weather conditions; parameters related to predicted future weather conditions; parameters related to climate; and any combination of the above.

It is a further object of this invention to disclose a method as defined in any of the above, further comprising steps of The method according to claim 40, further comprising steps of (a) disposing two rings constructed of magnetic material about the circumference of said sleeve such that the plane defined by the ring is perpendicular to the longitudinal axis of said sleeve and located beyond the mouth of said gun barrel, said two rings separated by a distance $D_P$ as measured parallel to the longitudinal axis of said sleeve and disposed about said sleeve further from the mouth of said gun barrel than the furthest of said oblique rings; (b) measuring the time $t_p$ for said magnetic sensor to traverse send two rings separated by a distance $D_P$; and (c) calculating the linear velocity V' from the relation $$V' = \frac{D_P}{t_P}.$$

It is a further object of this invention to disclose such a method as defined in any of the above, further comprising steps of (a) obtaining a projectile comprising a drag control system as defined above, and (b) controlling the drag of said projectile by, opening said iris to the degree required to bring the projectile's drag to a predetermined value.

It is a further object of this invention to disclose such a method as defined in any of the above, further comprising (a) obtaining a projectile comprising a drag control system as defined above and further comprising a secondary charge; (b) firing said secondary charge; and controlling the drag of said projectile by opening said iris to the degree required to bring the projectile's drag to a predetermined value.

BRIEF DESCRIPTION OF THE DRAWINGS

The invention is now described with reference to the drawings, wherein.

DETAILED DESCRIPTION OF THE PREFERRED EMBODIMENTS

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figures and described in the specification, but only as indicated in the accompanying claims, with the proper scope determined only by the broadest interpretation of said claims.

As used herein, the term "parameter of motion" refers to any parameter related to change in position of a moving body as a function of time. Such parameters include but are not limited to linear velocity, linear acceleration, angular velocity, angular acceleration, distance traveled, altitude, and direction of motion.

As used herein, the term "helix angle" refers to the angle of a helix or of an oblique ring with respect to a plane perpendicular the longitudinal axis of the object encircled by the helix or oblique ring. In particular, for the sake of convenience, in reference to the invention herein disclosed, the term "helix angle" is used to describe not only the angle made by a helical ring surrounding the non-magnetic sleeve, but also that made by an oblique ring that is not part of a helix.

As used herein, the term "oblique ring" refers to a material that partially or entirely surrounds the circumference of the non-magnetic sleeve with a helix angle of greater than zero. For simplicity, the term is used to refer both to closed rings that completely encircle the sleeve and to helical rings that wind about the sleeve. For embodiments in which a helical ring is used, references to a particular oblique ring are intended to mean the turn of the helix analogous to the particular oblique ring described.

As used herein, numbering of objects or events always follows the order from nearest the muzzle of the gun to farthest, in other words, the order in which the objects are encountered by, or the events occur to, the projectile after it is fired from the gun. As a non-limiting example, the "first" ring is nearer the muzzle of the gun than the "second" ring, and consequently, after it is fired from the muzzle of the gun, the projectile will pass the first ring before it passes the second ring.

The system herein disclosed comprises two sub-systems: an on-board measurement and control system located within a projectile that includes inter alia on-board magnetic sensors, and a non-magnetic sleeve with magnetic components that are sensed by the on-board magnetic sensors as the projectile traverses the magnetic components.

Figure 1A:
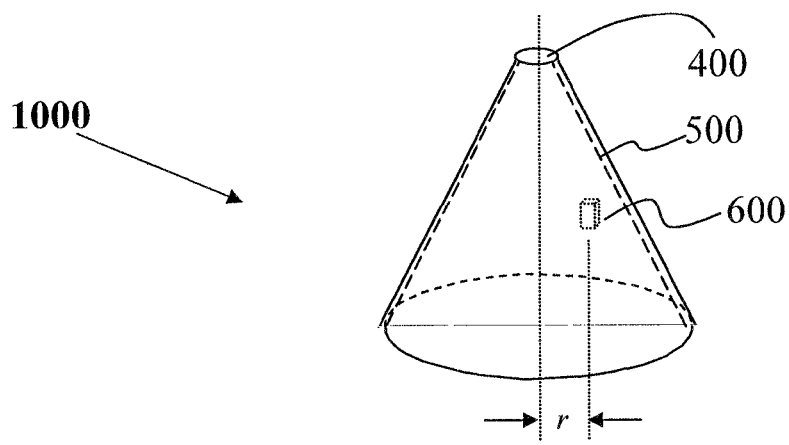
FIG. 1 presents a schematic diagram of the components of the system that are located within the projectile according to some embodiments of the invention herein disclosed.
Figure 1B:
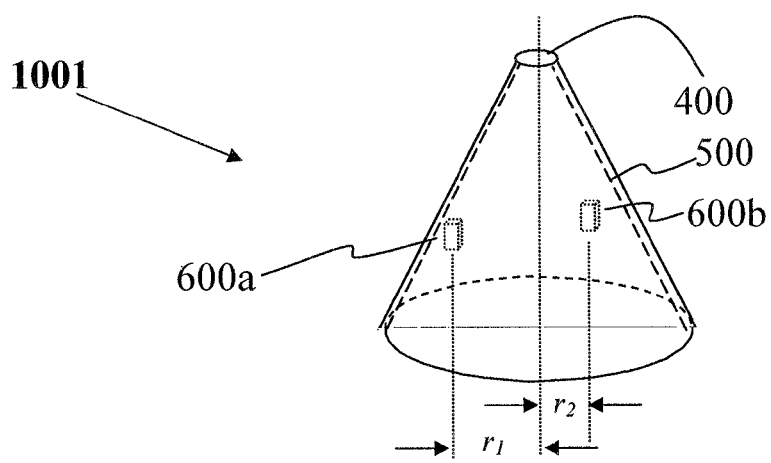
Figure 1C:
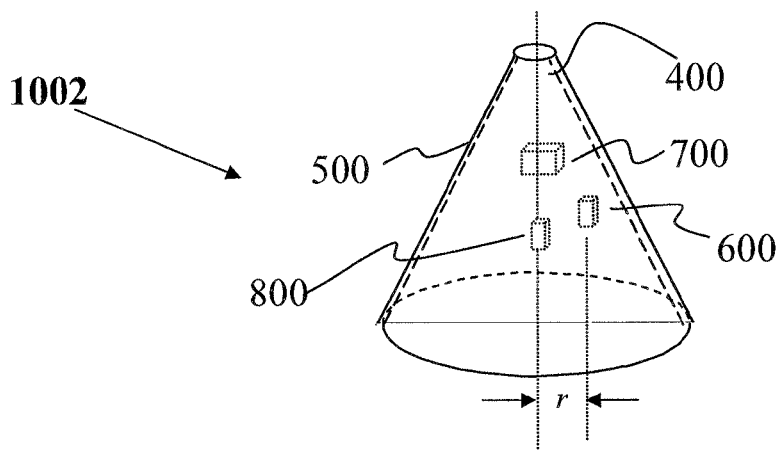

Reference is now made to FIG. 1, which presents schematic views of the onboard sensors located within projectile 400. FIG. 1A illustrates an embodiment 1000 comprising the simplest possible arrangement, in which one magnetic sensor 600 is located within the projectile, displaced from the longitudinal axis of the projectile by a distance r. The magnetic sensor may be of any type known in the art. In preferred embodiments of the invention, Anisotropic Magnetoresistive (AMR) sensors are used. In all of the embodiments illustrated in FIGS. 1A-1C, all sensors located within the projectile are in electrical connection with a control system (not shown in the figure) adapted for measurement and calculation of trajectory parameters; the control system is described in detail below. The control electronics comprise a microprocessor comprising at least a timing circuit and a logic circuit. In preferred embodiments of the invention, the microprocessor comprises or is in logical connection with a high speed A/D converter. The timing circuit must have sufficient resolution to differentiate successive signals generated by the magnetic sensor; as explained in detail below, in typical embodiments of the invention, the timing circuit (and the A/D converter) has at least a 100 MHz sampling rate. The logic circuit of the microprocessor is preprogrammed to perform the calculations described in detail below for determining the linear and angular muzzle velocities. In preferred embodiments of the invention, the sensors and control electronics are enclosed within an RF shield 500. The RF shield prevents interference from external signals; in preferred embodiments of the invention, the RF shield is constructed of stainless steel.

In other embodiments of the invention, more than one magnetic sensor is included within the projectile. In these embodiments, the projectile encloses p independent magnetic sensors, each of which is located at a distance $r_p$ from the longitudinal axis of the projectile. FIG. 1B illustrates another embodiment 1001 of the projectile in which p=2, and the two magnetic sensors 600a and 600b are located at distances $r_1$ and $r_2$ respectively from the longitudinal axis. For embodiments in which p>1, the values of $r_p$ may be equal or different. The additional magnetic sensors can be used to enable redundancy checking of the measurements, as backups to the primary magnetic sensor, or to increase the accuracy of the nominal trajectory parameters via averaging of the values independently obtained.

As described in detail below, in preferred embodiments of the invention, the onboard measurement and control system additionally comprises means for providing course correction in response to the linear and angular muzzle velocities determined as the projectile exits the gun. For these embodiments, additional sensors will in general be necessary. FIG. 1C illustrates an exemplary embodiment 1002 of a projectile for use with such embodiments of the invention. In addition to the components shown in FIGS. 1A and 1B, the projectile encloses at least one accelerometer 700 capable of measuring acceleration in three dimensions (one accelerometer is illustrated in FIG. 1C), at least one 3D rate-gyroscope, and at least one magnetometer 800 capable of measuring magnetic field strengths in three dimensions disposed along the projectile's longitudinal axis.

Figure 2:
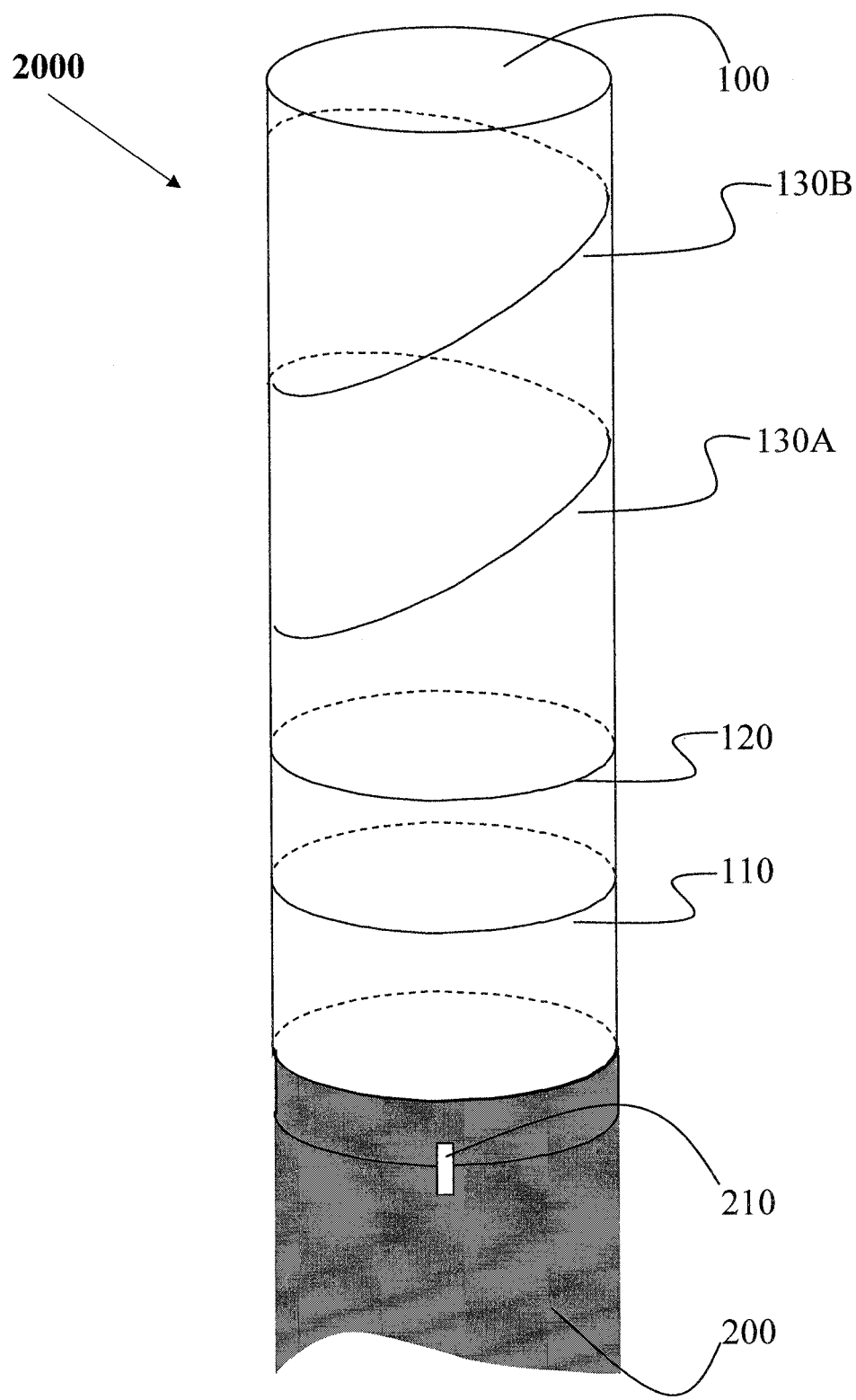
FIG. 2 presents a schematic diagram of the non-magnetic sleeve according to one embodiment of the invention herein disclosed.

Reference is now made to FIG. 2, which presents a schematic illustration of an embodiment 2000 of the second part of the invention herein disclosed, namely, a non-magnetic sleeve (100) with magnetic components. The non-magnetic sleeve is cylindrical in shape and may be constructed of any non-magnetic material suitable for use with the particular gun and projectile being used. In preferred embodiments, the sleeve is constructed of a non-magnetic mesh. The inner diameter of non-magnetic sleeve 100 is appropriate to provide a slip fit over the muzzle of gun barrel 200. In preferred embodiments of the invention, the muzzle and the matching end of the non-magnetic sleeve are provided with means for fixing their relative orientations, e.g. by a tab-and-slot or mark arrangement 210.

The sleeve system comprises two sets of rings made of a suitable magnetic material; in preferred embodiments of the invention, the rings are constructed from magnets made of neodymium-iron-boron alloy ("NdFeB magnets"). The rings are disposed about the circumference of the sleeve. In some embodiments, they are located on the outer circumference of the sleeve and are attached and fixed in place by any suitable means that will fix the positions of the rings known in the art (i.e. any means by which the horizontal orientation relative to the longitudinal axis and the value of $D_1$ will not be significantly affected by the passage of the projectile); non-limiting examples include non-magnetic brackets, screws, etc. In other embodiments, grooves are cut into the sleeve of depth and width suitable to provide a tight fit for the rings, and the rings are placed within these grooves.

A first horizontal ring 110 and a second horizontal ring 120 are located nearest the muzzle of the gun barrel, and are disposed about the sleeve such that each lies in a plane perpendicular to the longitudinal axis of the sleeve. The two horizontal rings are separated by a distance $D_1$. $D_1$ should be at least large enough that the magnetic sensor 600 carried within the projectile and the timing circuit can interpret the signals produced as the projectile passes by each of the rings as separate signals recorded at times $t_0$ and $t_1$, respectively. As explained in detail below, the minimum useful value of $D_1$ is that which enables the measurement of the time difference between successive pulses with sufficient accuracy to allow the parameters of motion to be determined to the desired level of accuracy. This value will therefore depend on, among other things, the time resolution of the measurement system (e.g. the digitization rate of the A/D converter). In typical embodiments of the invention, $D_1$ is between 5 mm and 300 mm. In preferred embodiments, $D_1$ is between 40 mm and 150 mm.

In addition to the horizontal rings, a plurality of oblique rings 130A, 130B, etc. are disposed about the sleeve. The distance between the point on the first oblique ring passed by a projectile fired from the gun that is closest to the first horizontal ring (110) is defined as $D_2$. In typical embodiments of the invention, $D_2$ is between 5 mm and 300 mm. In preferred embodiments of the invention, $D_2$ is between 30 mm and 200 mm. The oblique rings are disposed about the sleeve with a helix angle $\theta$, and are separated (as measured along the longitudinal axis of the sleeve) by a distance $\Delta D$. In the embodiment shown in FIG. 2, two oblique rings are shown, but the invention is not limited to any specific number. In preferred embodiments of the invention, the oblique rings are part of a single helical ring that makes at least two complete turns around the circumference of the sleeve. As with horizontal rings 110 and 120, the oblique rings may be attached to the outer circumference of the sleeve by any means known in the art that will maintain their position along the circumference of the sleeve (i.e. fixed with sufficient stability that $\theta$ and $\Delta D$ will not be significantly affected by the passage of the projectile). As with the horizontal rings, the oblique rings may be affixed to the sleeve via a groove of appropriate depth, width, and helix angle.

In other embodiments of the invention, the distance between successive rings is fixed by fixing the rings to at least one rod made of a non-magnetic material. The rods may then be fixed to the sleeve. As non-limiting examples, the two horizontal rings may be held at a fixed distance $D_1$ by attachment to one or more rods of length of at least $D_1$; oblique rings attached to one or more rods of at length at least $\Delta D$; or all of the rings may be attached to a single set of rods, which are then connected to the sleeve. These connections may be made by any means known in the art, either a temporary connection (e.g. via bolting or the use of brackets) or a permanent connection (e.g. by welding).

In a manner similar to that described above for the horizontal rings, the separation between successive oblique rings $\Delta D$ is constrained by the requirement the separation be large enough that the magnetic sensor and associated timing circuit can accurately measure the time difference between the maxima in the signals created as the projectile traverses the rings. In addition, for a given $\Delta D$, helix angle $\theta$ is constrained by the requirement that the projectile rotate less than one time between its traversal of the first oblique ring and the subsequent ring. In typical embodiments of the invention, $\Delta D$ is between 5 mm and 300 mm inclusive, and $\theta$ is between 1° and 89° inclusive. In preferred embodiments of the invention, $\Delta D$ is between 30 mm and 200 mm inclusive, and $\theta$ is between 5° and 45° inclusive.

These sets of magnetic rings enable the system to determine the linear and angular muzzle velocities as the projectile passes by. A general description of the measurements and calculations will now be given, followed by a more detailed description of the onboard measurement and control electronics system that is used for the actual data acquisition and processing. For simplicity, the description is given for embodiments in which a single magnetic sensor is present. It is understood that for those embodiments in which p magnetic sensors (p>1) are enclosed within the projectile, the calculations and measurements described below are made independently for each of the p sensors. In these cases, the measurement and control electronics will include p separate channels, one for each sensor. The relevant times and distances are summarized in FIG. 3; the distances as herein defined are illustrated on the right hand side of the figure, and the times at which the projectile passes through various points as it traverses the sleeve as herein defined are illustrated on the left hand side of the figure.

Figure 4:
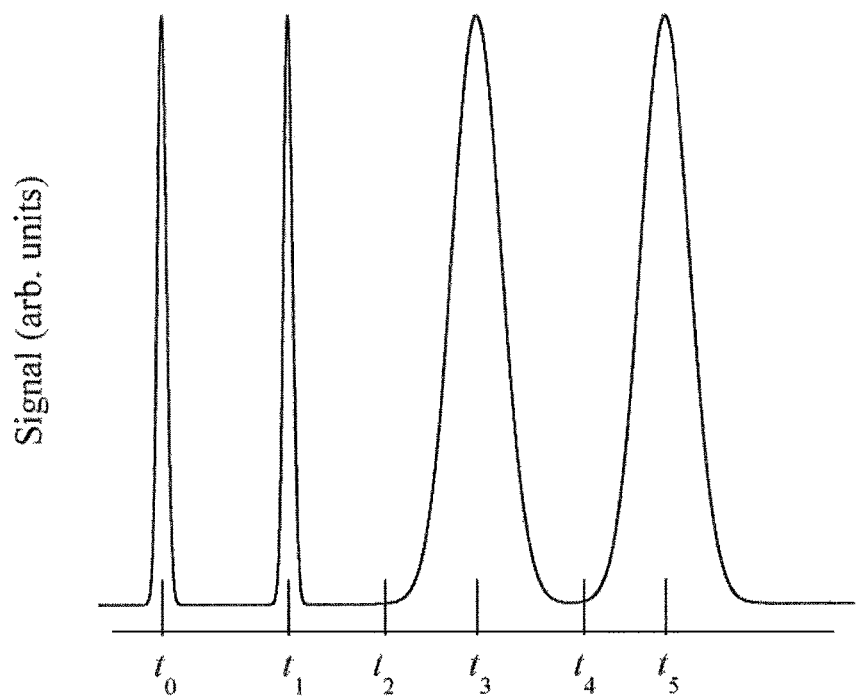
FIG. 4 presents a qualitative graph of the signals produced by the magnetic sensor and used in the determination of the linear and angular muzzle velocities according to the present invention.

As the projectile passes through the sleeve, the magnetic sensor inside will produce a signal as it encounters each of the magnetic rings in succession. Reference is now made to FIG. 4, which presents a qualitative graph of the signals thus produced. The time at which the magnetic sensor passes through the first horizontal ring 110 is defined as $t_0$, and the time at which it passes through the second horizontal ring

120 is defined as $t_1$. Since the distance between the two rings $D_1$ is fixed, the linear velocity V is easily calculated as $$V = \frac{D_1}{t_1 - t_0}.$$

In some embodiments of the invention, the system includes at least one additional horizontal ring 125 made of magnetic material. As described in detail below, the signal(s) produced as the magnetic sensor passes through the additional ring(s) can be used to provide a second measurement of the projectile's muzzle velocity, or as a means for calculating its residual acceleration. In some embodiments of the invention (not shown in the figures), the system includes an additional pair of horizontal rings disposed near the end of the sleeve. This additional pair of rings enables measurement of the velocity of the projectile as it leaves the system. This measurement can provide a correction to the velocity measured at the muzzle exit, thus increasing the accuracy of the trajectory calculations.

In embodiments in which there are more than two horizontal rings, the linear velocity can be measured in an analogous fashion between any pair of horizontal rings or as the average of successive measurements. Furthermore, in these embodiments, the linear acceleration A of the projectile can be determined from the relation $$A = \frac{V' - V}{t_A - t_0},$$

where $t_A$ is the time at which the magnetic sensor passes the third ring and V' is the velocity, calculated as above from the time difference between $t_A$ and $t_2$. In embodiments with two pairs of rings, separate velocity measurements can be made using the first pair of rings and the second; if the velocities are not equal (e.g. due to the charge not being completely consumed before the projectile exits from the gun or due to transverse motions of the projectile within the gun or sleeve, especially those due to vibrational or oscillatory motion of the projectile), then more accurate trajectory calculations can be made using the value determined at the exit of the system, and the velocity changes within the sleeve can be estimated. We note that these types of corrections are expected in general to be quite small relative to the value of the linear velocity.

The linear velocity is then used to calculate the time $t_2$ at which the magnetic sensor passes through distance $D_2$, i.e. the time at which the magnetic sensor arrives at a distance corresponding to the point on the first oblique ring closest to the muzzle of the gun. Since $D_2$ is also fixed, $t_2$ can be calculated from the following relations:

$$D_2 = V(t_2 - t_0)$$

$$t_2 - t_0 = \frac{D_2}{V}$$

$$t_2 = \frac{D_2}{V} + t_0$$

In embodiments in which more than one measurement of V is made, the changes in V are taken into account in the calculation of $t_2$. As shown in FIG. 4, the signal recorded by the magnetic sensor as it passes through the first oblique ring will rise to a maximum at time $t_3$. Time $t_3$ will occur when the magnetic sensor (which, it will be recalled, is displaced from the longitudinal axis) passes through the plane of the first oblique ring (in preferred embodiments, the first turn of the helix), at a distance $D_3$ beyond $D_2$, since at that point it will be closest to the magnetic material of the ring. From the measured value of $t_3$, the calculated value of $t_2$, and the known linear velocity V, $D_3$ can be calculated from the relation $D_3 = V(t_3 - t_2)$.

Figure 3:
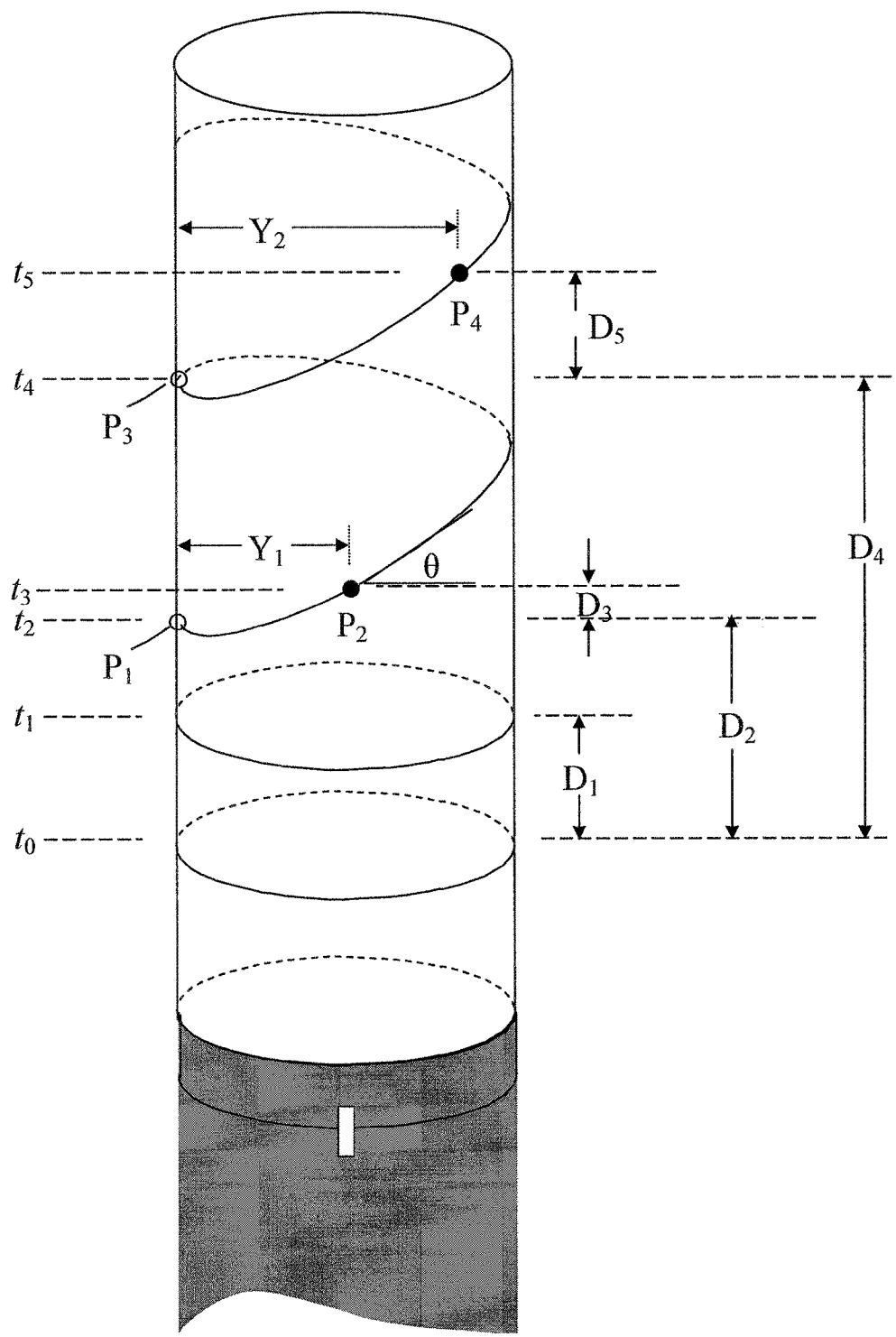
FIG. 3 presents symbols used in the definitions and calculations of times and distances as they relate to the components of the system herein disclosed.

Since the magnetic sensor is offset from the longitudinal axis, the rotational orientation (roll state) of the projectile can be determined. First, a reference point $P_1$ is defined. This point may be anywhere on the circumference of the sleeve. In preferred embodiments, for ease of calculation, $P_1$ is located at the point on the first oblique ring or helix) closest to the muzzle of the gun, as shown in FIG. 3. The point on circumference of the first oblique ring (first turn of the helix) opposite the magnetic sensor as it passes through (i.e. lying on the radius connecting the sensor to the longitudinal axis of the sleeve), $P_2$, will be that point on the circumference of the first oblique ring located a distance $D_3$, as measured parallel to the longitudinal axis of the sleeve, from a line drawn perpendicular to the longitudinal axis of the sleeve at distance $D_2$, as can be seen from FIG. 3. The orientation of $P_2$ relative to $P_1$ can be determined by calculation of chord $Y_1$, which is the second leg of a right triangle with hypotenuse $P_1$-$P_2$, a first leg of length $D_3$, and angle $\theta$ opposite the first leg. The solution of this triangle yields $$Y_1 = \frac{D_3}{\tan\theta}.$$

The roll state of the projectile at time $t_3$ is defined by the angle $\phi_1$ subtended by chord $Y_1$, which will be the angle opposite $Y_1$ of an isosceles triangle with legs of length $r_{ring}$, where $r_{ring}$ is the radius of the oblique rings. Since $r_{ring}$ is known, $\phi_1$ can readily be calculated from the law of cosines to $$\text{yield}\phi_1 = \cos^{-1}\left[\left(\frac{Y_1}{2r_{ring}}\right)^2 + 1\right].$$

An entirely analogous set of measurements and calculations is performed as the projectile passes through the second oblique ring (in preferred embodiments, the second turn of the helix). A reference point $P_3$ is defined on the circumference of the ring. For ease of calculation, in preferred embodiments, $P_3$ is chosen to lie at a distance $D_4$ from the first horizontal ring, where $D_4$ is distance from the first horizontal ring to the point on the second oblique ring closest to the muzzle of the gun, along a line parallel to the longitudinal axis that contains $P_1$. In the more general case, any reference point $P_3$ can be chosen, as long as the distance from the horizontal ring and the angle $\zeta$ between $P_1$ and $P_3$ relative to the longitudinal axis of the sleeve are known.

The time $t_4$ at which the magnetic sensor passes through distance $D_4$, is calculated in a fashion analogous to that used to calculate $t_2$; from the known distances and linear velocity V, $$D_4 = V(t_4 - t_0)$$

-continued $$t_4 - t_0 = \frac{D_4}{V}$$

$$t_4 = \frac{D_4}{V} + t_0$$

The time $t_5$ at which the magnetic sensor passes through the plane defined by the second oblique ring (second turn of the helix) is determined in the same fashion that $t_3$ was determined. Since in general the projectile will be rotating about its axis as it moves through the sleeve, $P_4$, the point on the circumference of the ring opposite to the magnetic sensor at time $t_5$, will not normally be aligned with $P_2$. The calculation of the roll state at time $t_5$ is performed in the same fashion as the calculation for the roll state at time $t_3$. The chord $Y_2$ is calculated from reference point $P_3$, distance $D_5$, and angle $\theta$, as the second leg of a right triangle with hypotenuse $P_3$-$P_4$, a first leg of length $D_5$, and angle $\theta$ opposite the first leg. The solution of this triangle yields $$Y_2 = \frac{D_5}{\tan\theta}.$$

The roll state angle $\phi_2$ at time is calculated in an analogous fashion to the calculation of $\phi_1$, to yield $$\varphi_2 = \cos^{-1}\left[\left(\frac{Y_2}{2r_{ring}}\right)^2 + 1\right].$$

The angular muzzle velocity of the projectile $V_{ang}$ is thus equal to $$V_{ang} = \frac{\varphi_2 - \varphi_1 + \zeta}{t_5 - t_3}.$$

As mentioned above, in preferred embodiments of the invention, $\zeta=0$. While the figures depict rotation with a particular orientation, the method does not depend on knowledge of the direction of spin of the projectile; in any case, in the case in which a rifled gun barrel is used, the direction of rotation of the projectile will be known or easily calculated.

In addition to the improved accuracy in the calculation of the trajectory of the projectile, accurate measurement of the parameters of the motion of the projectile also enables calculation of the projectile's altitude as a function of time after launch more accurately than is possible by use of devices such as altimeters. A more accurate calculation of the projectile's altitude is especially useful in cases in which detonation of the projectile is desired at a specific altitude.

The above calculations are given for the simplest case, that is, for embodiments of the invention in which the projectile encloses only one magnetic sensor, and the sleeve incorporates two horizontal rings and two oblique rings (in preferred embodiments, a helix of exactly two turns). Additional embodiments of the invention may include cases in which there are more than two horizontal rings or more than two oblique rings. In different embodiments of the invention in which additional rings are present, the calculations of V and $V_{ang}$ can be performed between any pair of rings (e.g. the first and third rings rather than the first and second); separately between each successive pair of rings and the values thus obtained averaged to produce nominal values of V and $V_{ang}$.

In a manner entirely analogous to the means described above for calculating the linear acceleration A, the angular acceleration can be calculated in embodiments in which the number n of oblique rings is greater than 2. The angular velocity $V_{ang}$ is calculated during passage through one pair of the oblique rings and then a second measurement of the angular velocity $V_{ang}'$ is made based on passage through a second pair of oblique rings (e.g. through the second and third). The angular acceleration $A_{ang}$ is then calculated from $$A_{ang} = \frac{V_{ang}' - V_{ang}}{t_{5m}' - t_3},$$

where $t_{5m}'$ is the time at which the magnetic sensor passes through the second of the second pair of oblique rings.

It will be seen that in some embodiments of the invention, ambiguities are possible in the measurement of the angular velocity. For example, if an actual oblique ring is used, for any value of $D_3$ ($D_5$) (except for the cases where $D_3$ ($D_5$) is located at the point nearest to or farthest from the muzzle of the gun), there are two possible locations of point $P_2$ ($P_4$). Thus, in some embodiments of the invention, the timing circuit includes programming that does not accept a fourth signal from the magnetic sensor until it has cleared the first oblique ring (i.e. programming a wait time $$t_{wait} = \frac{2r_{ring}\tan\theta}{V}$$

and not recording any signal from the magnetic sensor until a time of at least $t_{wait}$ after $t_2$ has passed). Note that in cases where there are two possible locations of $P_2$ and $P_4$, this additional precaution will remove any ambiguity in the determination of $\phi$. Since $\cos(\theta)=\cos(-\theta)$, it does not matter which of the two possible locations of $P_2$ is used as long as $P_4$ is chosen to lie on the same side of the sleeve.

Figure 5:
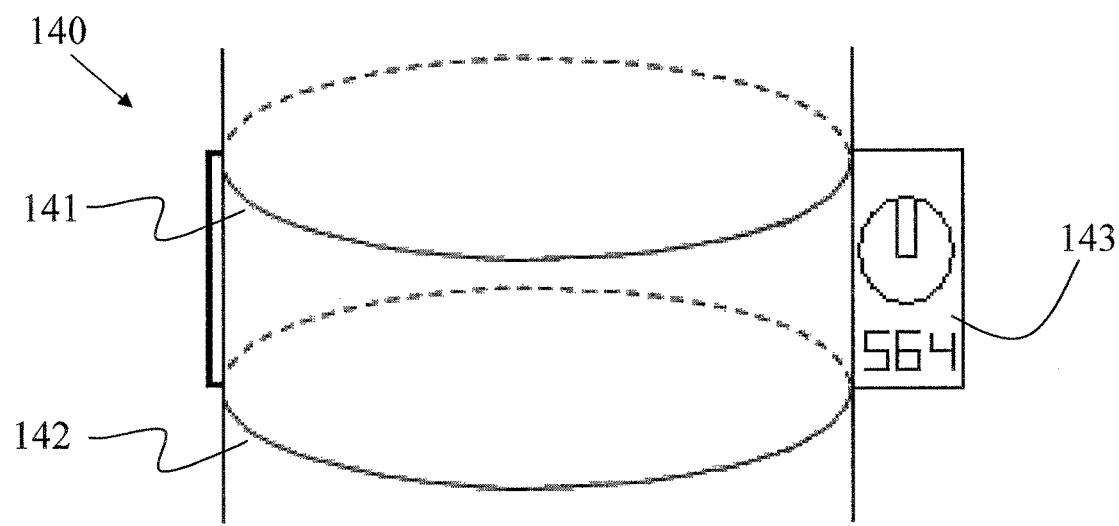
FIG. 5 presents a schematic diagram of one embodiment of a system for transmitting parameters to the projectile as it traverses the sleeve.

In some embodiments of the invention, it further includes a system 140 for enabling parameter entry after the linear velocity V has already been determined. Reference is now made to FIG. 5, which shows a schematic diagram illustrating one embodiment of such a system. System 140 comprises two horizontal magnetic rings 141 and 142, the distance $D_P$ between which can be varied along with means 143 (e.g. a dial) for setting and recording $D_P$. The means for varying the distance can be any one known in the art, e.g. by one or more expandable joints or rods that are manually or electronically adjustable. $D_P$ is set prior to the firing of the gun, and is chosen to correlate with a desired parameter relevant to the firing or aiming of the gun, and is chosen according to a predetermined protocol to correlate with a predetermined firing or aiming parameter (e.g. elevation, azimuth, amount of charge, target location, etc.). Since the linear velocity V is already known from the time it took the projectile to traverse distance $D_1$, the distance $D_P$ can be calculated from the time $t_P$ it takes the magnetic sensor to traverse the two rings 141 and 142. The processor will have been programmed to measure $D_P$ only from signals received after the projectile has already traversed the final oblique ring. As a non-limiting example, the processor in the projectile can be programmed to calculate 1° of elevation of the gun for every mm of distance between the two rings. The value of this parameter, calculated from $D_P$, will then be entered into the processor's memory and used for calculating necessary course corrections to bring the projectile to its target. One skilled in the art will readily see that this method or one equivalent to it can be used to provide any desired parameter to the projectile. One advantage of system 140 is that the information is sent to the projectile automatically without the necessity of involvement of or interference with any computer system involved in the control, aiming, or firing of the gun.

Figure 6:
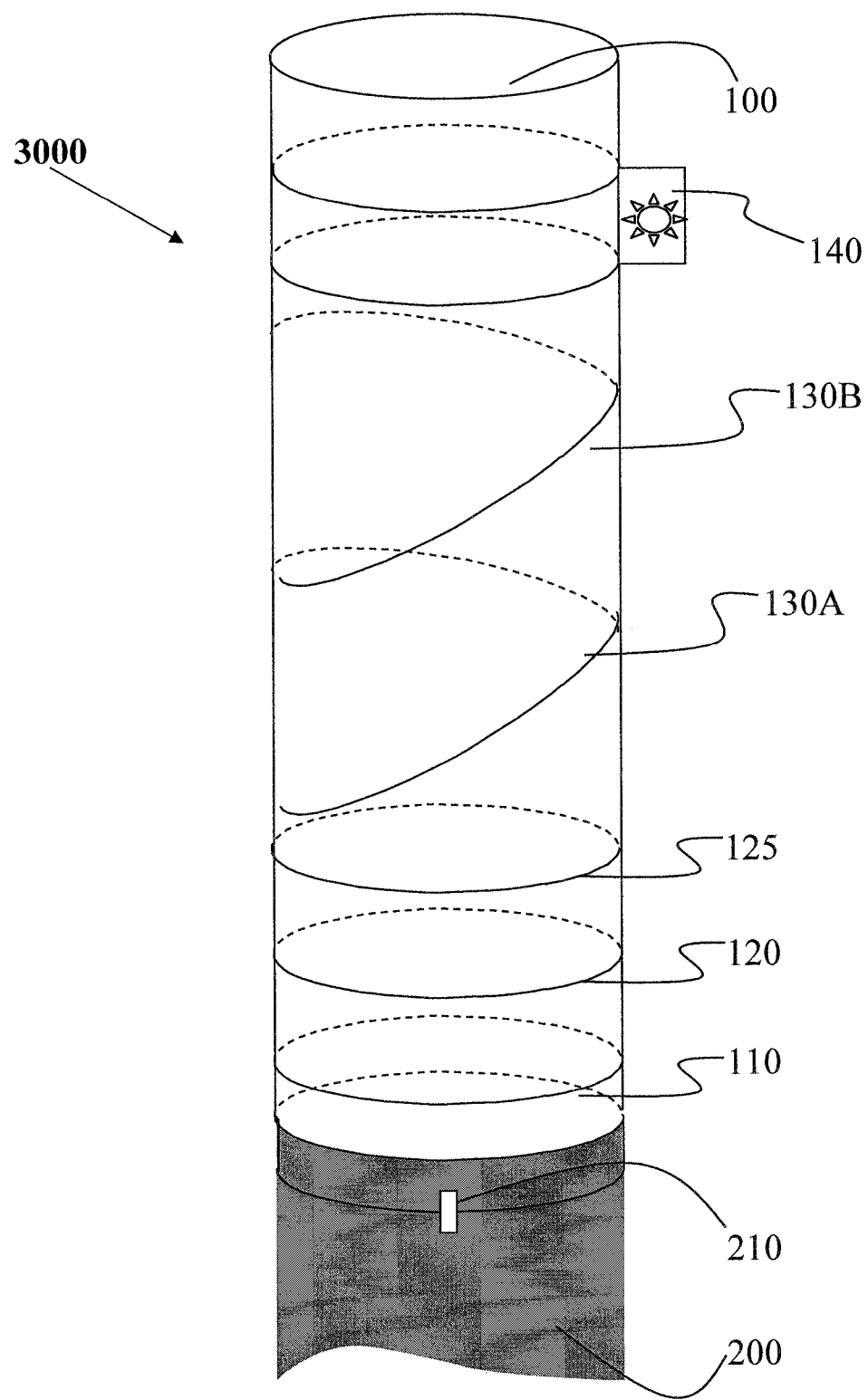
FIG. 6 presents a schematic diagram of the non-magnetic sleeve and its associated components according to one embodiment of the invention herein disclosed.

Reference is now made to FIG. 6, which shows an embodiment 3000 of the system that includes both a third horizontal ring 125 and the parameter entry system 140 described above. The third horizontal ring can be used to derive the linear acceleration as described above, and the parameter entry system is placed near the end of the sleeve in order to enable parameter entry after all of the measurements relevant to parameters of motion have been made.

While the main object of the invention is to provide means for determining the linear and angular muzzle velocities of a projectile in which all measurements and calculations are performed entirely onboard, it is within the scope of the invention to include embodiments that further comprise means for communicating the values obtained to a location external to the projectile. In various embodiments, the projectile itself can comprise means for transmitting the information (e.g. via a radio, microwave, or optical transmitter) to a receiver remote from the gun; it can comprise means for transmitting the information to a transceiver located on or in proximity to the gun, which transceiver then transmits the information to a remote location; or external magnetometers can be located on the gun in order to make the measurements independently of the projectile, and then transmit the results to a remote location in order to provide data for range correction and mortar charge correction for subsequent firings of the gun.

In preferred embodiments of the invention, the projectile comprises means for in-flight course corrections. For example, in preferred embodiments, the projectile comprises a plurality of adjustable fins (canards) and means (motors, servos, power sources, etc.; such means are well known in the art) for adjusting the fins. In these embodiments, in addition to a microprocessor unit for measurement, calculation, and storage of trajectory parameters, the onboard control system comprises an inertial navigation system (INS). After the linear and angular muzzle velocities are determined and are added to the preloaded values of azimuth and attitude of the canister as well as canister longitude, latitude and altitude are reported to the INS, the INS then uses this information, along with the pre-entered target location parameters (e.g. longitude, latitude, and altitude) to guide the projectile to its target.

Figure 7:
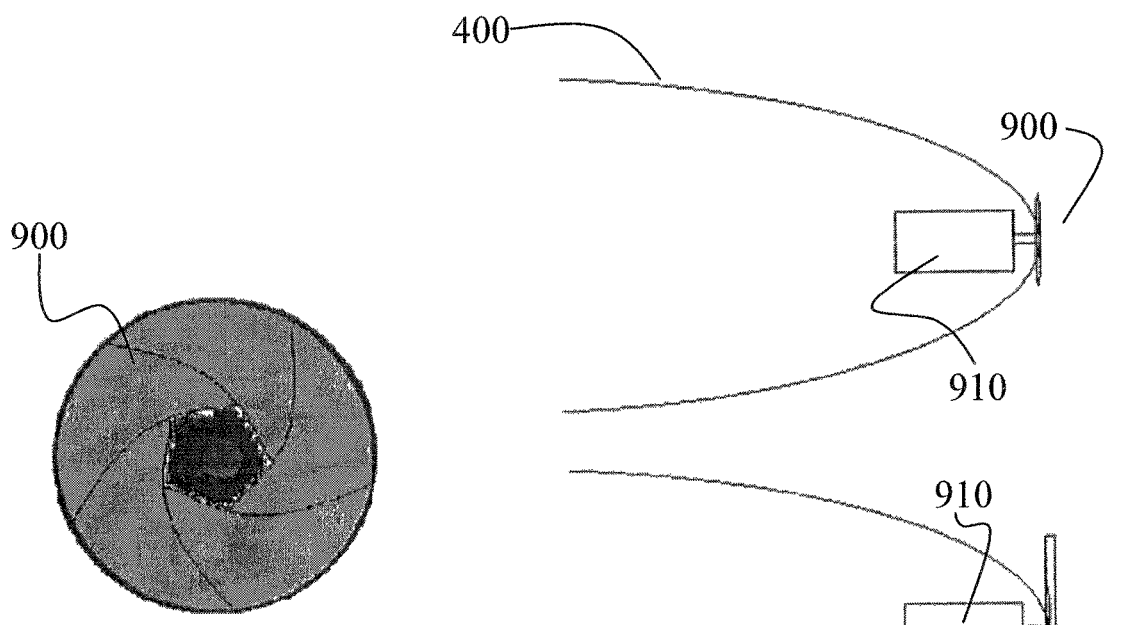
FIG. 7 presents a schematic diagram of a means for drag control of the projectile according to one embodiment of the invention herein disclosed.

In other embodiments of the invention, the projectile does not comprise fins. Such embodiments provide for lower-cost projectiles than those embodiments in which the projectile comprises fins and consequently the control mechanisms required (e.g. servo motors) for the fins. In embodiments without fins, it is nonetheless possible to provide means for controlling the trajectory of the projectile in flight. In preferred embodiments of the invention in which the projectile does not comprise fins, the projectile additionally comprises means for controlling its drag. Reference is now made to FIG. 7, which shows a means for controlling the drag of projectile 400 according to one embodiment of the invention. In this embodiment, the projectile additionally comprises a reversibly openable iris 900. A front view of the iris according to a typical embodiment of the invention is shown in FIG. 7A. The iris comprises a control apparatus 910 in physical connection with the iris and in logical connection with the control electronics. The iris, control apparatus, and electronic control means may be of any appropriate type known in the art. FIG. 7B shows a schematic side view of a projectile comprising an iris in which the iris in its closed position (i.e. minimum drag), while FIG. 7C shows the same view in which the iris is in its maximally opened position (i.e. maximum drag). The iris can thus be opened by any desired amount in order to increase the drag on the projectile, thus decreasing its range from that calculated on the basis of the parameters of its motions determined as it traverses the sleeve.

In preferred embodiments of the invention in which the projectile comprises iris 900, the projectile further comprises a secondary charge. The secondary charge is chosen to be of sufficient size so as to guarantee that the projectile will have a range sufficient to carry it beyond its target. After the projectile has been fired and its trajectory calculated based on the parameters of motion determined during its traversal of the sleeve, a further calculation is done of the amount of additional drag needed to shorten the projectile's trajectory so that it reaches the target without overshooting it. Iris 900 is then opened sufficiently to provide this needed amount of drag. Thus, the system provides means for improving the accuracy and efficiency of the projectile. In preferred embodiments, these additional calculations are also done on board by the CPU of the projectile's control unit. In embodiments in which the projectile remains in communication with an external controller, it is also possible to have the calculations done externally and the results transmitted to the CPU.

Figure 8:
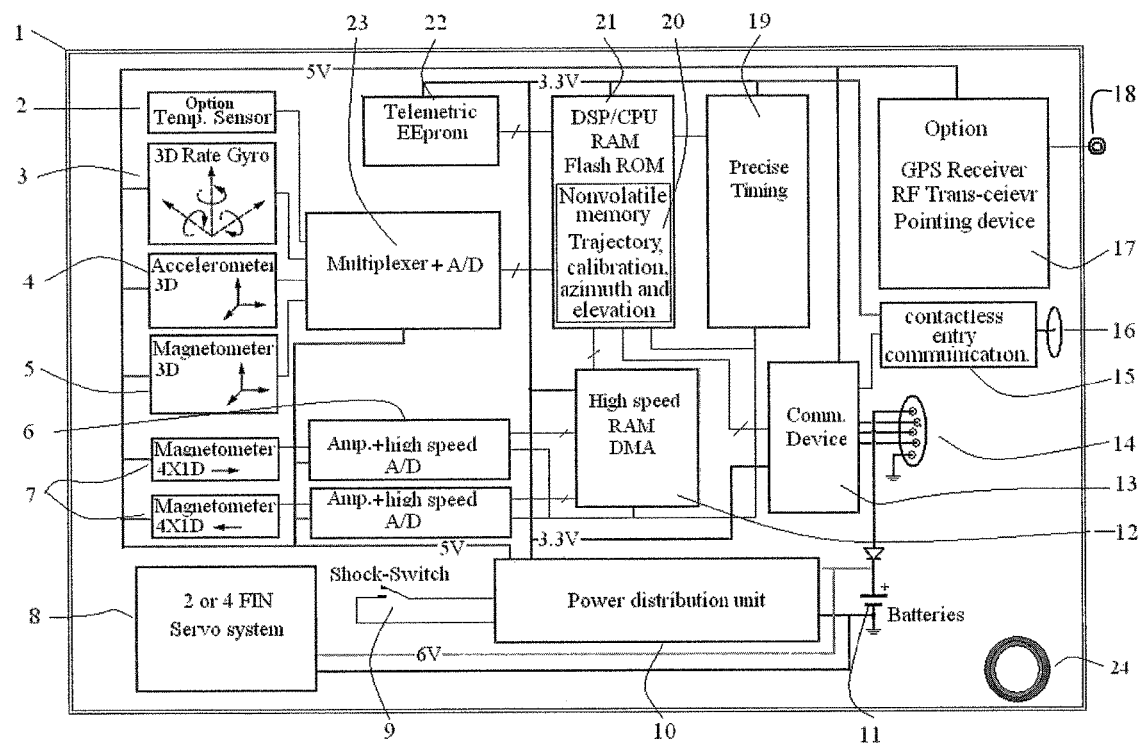
FIG. 8 presents a schematic diagram of the onboard control electronics according to one embodiment of the invention herein disclosed.

Reference is now made to FIG. 8, which presents a schematic diagram of an onboard microprocessor and control system INS according to a typical embodiment of the invention. Unless specifically stated otherwise, the individual components may be chosen from any known in the art that will perform the required function within the accuracy needed by the user of the invention. A general description of the INS is now provided, followed by additional detailed descriptions of some of the components.

The INS is enclosed in an RF protective cover 1; in preferred embodiments of the invention, the RF protective cover is made of stainless steel. In some embodiments, the INS includes a temperature sensor 2 for in-flight temperature measurement and correction for the changes with temperature of the sensitivity, accuracy, and/or calibration of the different components of the INS.

The INS provides controls for a 3D gyroscope (3), 3D accelerometer (4), and 3D magnetometer (5). These components (see FIG. 1C) are used for positional control and for determination of the point at which the projectile begins its free-fall trajectory. Signals from the magnetic sensors are (7) passed to a high-speed amplifier and A/D converter (6). The projectile electronics comprise a servo system (8) for control of the projectile's fins in response to the measured values of V and $V_{ang}$. In preferred embodiments, the projectile electronics further comprise a G-shock switch (9); the function of this switch is described in detail below. Power distribution unit 10 regulates and controls the voltages and currents. Power source 11 can be any appropriate power source such as chemical batteries, thermal power source, super capacitors or an on-board generator. A high-speed RAM module 12 is included for storage of the measured and calculated trajectory parameters (velocity, angular velocity, etc.).

In preferred embodiments of the invention, the projectile electronics further comprise an onboard communication device 13 and interface 14. Communication device can be any appropriate device known in the art for accepting externally provided data. Non-limiting examples include wired RF, contactless RF, optical communications means, and magnetic communications means. The communication device and interface can be used for program loading, factory calibration, testing, reading and writing of pre-launch data, etc. In cases where pre-launch data is sent to the projectile, it can be stored in the control electronics memory system for later recall for trajectory calculations and corrections. Non-limiting examples of pre-launch data that can be transmitted and stored in this fashion include the amount of charge; location of said gun barrel; azimuth; attitude; target location; expected target range; magnetic grid type; parameters related to current weather conditions (wind speed and direction, precipitation, cloud cover, etc.); parameters related to predicted future weather conditions; parameters related to climate; and any combination of the above.

Figure 9A:
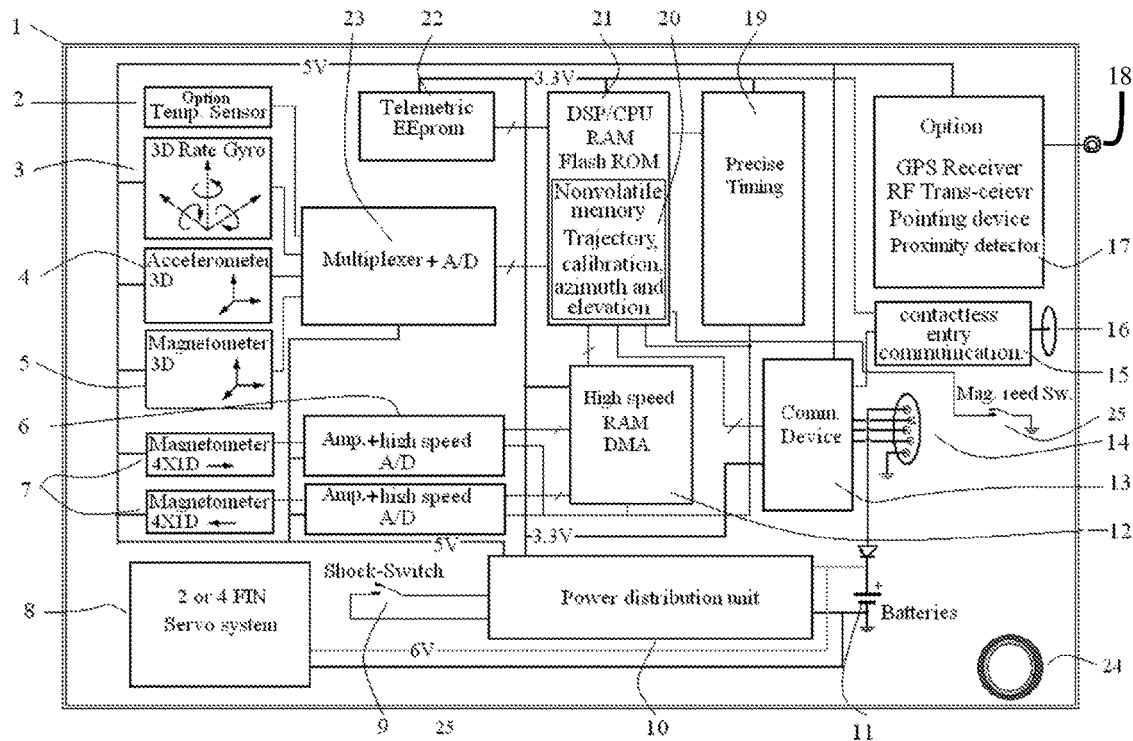
FIG. 9 presents a schematic diagram of the onboard control electronics according to another embodiment of the invention herein disclosed; and, FIG. 10 presents a schematic diagram of the onboard magnetic measuring hardware according to one embodiment of the invention herein disclosed.
Figure 9B:
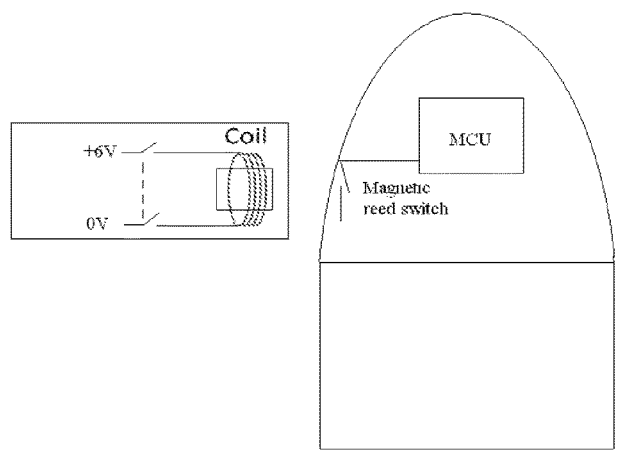

In preferred embodiments of the invention, these externally supplied data are provided to the projectile as close as possible to the time of launch. If a number of projectiles are in the vicinity of the launch zone, it is thus conceivable that a particular projectile might receive, record, and store data intended for a different one. Reference is now made to FIG. 9A, which illustrates schematically the projectile electronics in an embodiment designed to solve this problem. In these embodiments, the projectile electronics additionally comprise magnetic reed, switch 25. This normally-OFF switch connects at least part of the communications and data storage system (e.g. the receiver, the memory system, the data writing/reading system, or the entire electronics system) to its power supply. Passage of the projectile near a source of a magnetic field (e.g. a magnet or solenoid) activates the switch, energizing the communications/data storage system, thus ensuring that the data uploaded to the projectile is that data intended specifically for that projectile. The activation of the switch can be done manually, e.g. the person loading the projectile into the gun passes a magnet over it prior to loading it, or automatically by having the projectiles pass over a magnet as they are taken out of their final storage immediately prior to launch. An example of the placement of the switch according to one embodiment of the invention is shown schematically in FIG. 9B.

In some embodiments of the invention, as mentioned above, the control system is adapted to transmit data to a remote location; in these embodiments, the control system further comprises a remote communication system 16. In some embodiments of the invention, the control system further includes additional locating means such as a GPS, pointing device, RF transceiver, etc. 17 and associated input/output means 18.

The control system further comprises a timing circuit 19. The minimum time resolution of this circuit required for use in preferred embodiments is discussed in detail below. The control system further comprises non-volatile memory 20 for storage of such information as trajectory parameters, firing zone and target coordinates and altitude, climate conditions, etc.

The control electronics further comprise as a CPU a high-speed microprocessor 21. Any suitable DSP or other microprocessor known in the art suitable for receiving the signals from the high speed A/D converters may be used.

In preferred embodiments of the invention, the control electronics system further includes data logger 22 adapted for recording flight data. The information from the INS sensors (gyro 3, accelerometers 4, and magnetometers 5) is passed to the CPU via multiplexer—A/D converter 23.

In those embodiments of the invention in which it includes external signal generating means (e.g. the magnetometers attached to the sleeve that were discussed above), the control electronics further comprise magnetic ring 24 for providing a signal to an external magnetometer as the projectile traverses it.

As mentioned above, in preferred embodiments of the invention, it comprises a G-shock switch. The firing shock of a mortar shell is typically 6000-10000 G, and that of an artillery shell is typically 10000-22000 G. Such high accelerations will saturate any sensor such as an accelerometer located within the projectile. Thus, in preferred embodiments of the invention, the control system includes G-shock switch 9. This switch is adapted to provide power or an interrupt signal to the CPU only at such time as the acceleration of the shell has reached a certain level or as the projectile traverses the middle of the barrel Accurate calculation of V and $V_{ang}$ depends on the measurements of the signals from the magnetic sensor being made with sufficient time resolution. A time resolution sufficient to provide at least 50,000 samples between successive signals will be sufficient to provide a targeting error of 1 m over a 10 km trajectory. For a typical barrel velocity of 300 m s$^{-1}$ and a separation between successive magnetic loops ($D_1$, $\Delta D$) of ~0.2 m, the projectile will traverse the two loops in ~666 μs. 50,000 samples in 666 μs is equivalent to a sampling rate of one sample per 13.33 ns, i.e. 75 MS/s.

Figure 10:
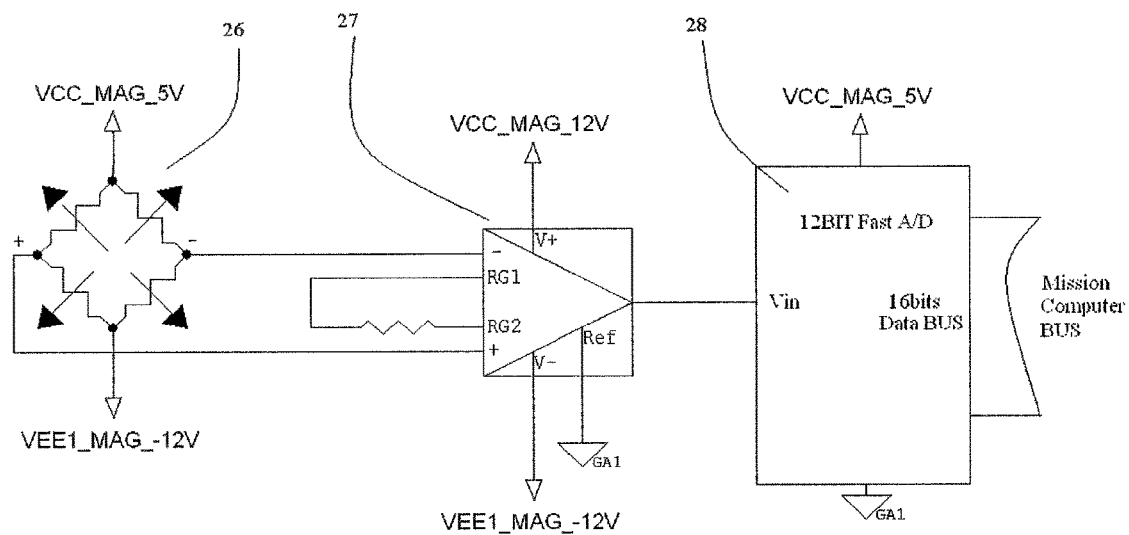

Reference is now made to FIG. 10, which illustrates schematically a sampling system that can provide the necessary sampling rate. Magnetoresistive element 26 (in preferred embodiments, an AMR sensor) is in electrical connection with high-speed differential amplifier 27. The output of the differential amplifier is then transmitted to a 100 MHz, 12 bit A/D converter, which then passes the signal to the CPU. Since the entire signal is collected and stored in memory, the actual signal maxima can be determined from the entire signal rather than by use of a comparator. The means by which the signal maximum is determined is preprogrammed into the CPU, and can be any means known in the art (e.g. via a curve fitting routine, statistical programming to identify and eliminate outliers, etc.). The determination of the signal maxima from an examination of the entire signal will thus eliminate errors associated with use of a comparator such as interference from spikes and outliers, false maxima from noisy signals, and broad peaks by such means well-known in the art as data smoothing, fitting the data to an appropriate peak shape, etc.

I claim:

1. A system for determining parameters of the motion of a projectile as it exits the muzzle of a gun barrel, wherein said system comprises:
    a projectile;
    p magnetic sensors, p≥1, located within said projectile, each of which is displaced from the longitudinal axis of said projectile by a distance $r_p$;
    a microprocessor located within said projectile, said microprocessor in electrical communication with said at least one magnetic sensor, said microprocessor comprising a timing circuit, a logic circuit, and data storage means, and being programmed to measure the relative timing of signals received from said at least one magnetic sensor and to calculate at least one parameter related to the motion of said projectile;
    a gun barrel from which said projectile is expelled, said gun barrel comprising a muzzle and a mouth;

a sleeve, constructed of non-magnetic material, extending from the mouth of said gun barrel and disposed such that the longitudinal axis of said sleeve is coincident with the longitudinal axis of said gun barrel;

a first horizontal ring, constructed of magnetic material, disposed about the circumference of said sleeve such that the plane defined by the ring is perpendicular to the longitudinal axis of said sleeve and located beyond the mouth of said gun barrel;

a second horizontal ring, constructed of magnetic material, disposed about the circumference of said sleeve such that the plane defined by the ring is perpendicular to the longitudinal axis of said sleeve and displaced from said first horizontal ring by a distance $D_1$ measured parallel to the longitudinal axis of said sleeve; and, a plurality n of oblique rings disposed about the circumference of said sleeve, said oblique rings characterized by:
a helix angle $\theta$;
a separation between two successive oblique rings m and m+1 of said plurality of n oblique rings ($1 \leq m \leq n-1$) equal to $\Delta D_m$; and,
a point on said plurality of oblique rings closest to the mouth of said gun barrel separated by a distance $D_2$ from said first horizontal ring ($D_2 > D_1$), $D_2$ and $\Delta D_m$ being measured parallel to the longitudinal axis of said sleeve.

2. The system according to claim 1, wherein said magnetic sensor is chosen from the group consisting of Anisotropic Magnetoresistive sensors and Hall effect sensors.

3. The system according to claim 1, wherein said microprocessor is additionally programmed to analyze the form of said signals as a function of time and to extract signal peaks from analysis of said form.

4. The system according to claim 1, wherein said at least one parameter related to the motion of said projectile is chosen from the group consisting of linear velocity, angular velocity, roll state, linear acceleration, angular acceleration, and any combination of the above.

5. The system according to claim 1, further comprising communications means, data transfer means, and means for storage of data received by said communications means, said means for storage of data received by said communications means in logical connection with said microprocessor, whereby externally supplied data is accepted and stored.

6. The system according to claim 5, wherein said externally supplied data is chosen from the group consisting of the amount of charge; location of said gun barrel; azimuth; attitude; target location; expected target range; magnetic grid type; parameters related to current weather conditions; parameters related to predicted future weather conditions; parameters related to climate; and any combination of the above.

7. The system according to claim 5, further comprising a magnetic reed switch disposed within said projectile such that at least one of said data storage means, said communications means, said data transfer means, and said means for storage of data received by said communications means is in electrical connection with its power source only after said projectile has passed close enough to a source of an external magnetic field sufficiently strong to activate said magnetic reed switch.

8. The system according to claim 1, wherein said sleeve is constructed of non-magnetic mesh.

9. The system according to claim 1, wherein $40 \text{ mm} \leq D_1 \leq 150 \text{ mm}$.

10. The system according to claim 1, wherein said plurality of third oblique rings comprises a single helical coil comprising at least two complete turns around the circumference of said sleeve.

11. The system according to claim 1, wherein $\theta$ is between 5° and 45°;
wherein $30 \text{ mm} \leq \Delta D_m \leq 200 \text{ mm}$ for all values of m;
wherein $30 \text{ mm} \leq D_2 \leq 200 \text{ mm}$;
wherein $2 \leq n \leq 3$; and
wherein $n > 2$ and $\Delta D_m = \Delta D$ for all values of m.

12. The system according to claim 1, further comprising a third horizontal ring constructed of magnetic material, disposed about the circumference of said sleeve such that the plane defined by said third horizontal ring is perpendicular to the longitudinal axis of said sleeve and displaced from said first horizontal ring by a distance $D_A$ as measured parallel to the longitudinal axis of said sleeve, wherein $D_A > D_1$.

13. The system according to claim 12, wherein $D_1 \leq D_A \leq 300 \text{ mm}$.

14. The system according to claim 12, further comprising at least one additional horizontal ring constructed of magnetic material, disposed about the circumference of said sleeve such that the plane defined by each of said additional horizontal rings is perpendicular to the longitudinal axis of said sleeve.

15. The system according to claim 12, wherein $$D_A > D_2 + \sum_m \Delta D_m.$$

16. The system according to claim 1, wherein said sleeve and said gun barrel further comprise a guide system chosen from (a) at least one matching tab and notch, (b) at least one pair of matching marks, and (c) any combination of the above such that proper alignment of said guide system fixes the rotational orientation of said sleeve relative to the longitudinal axis of said gun barrel.

17. The system according to claim 1, further comprising a parameter entry system, said parameter entry system comprising two rings constructed of magnetic material, disposed about the circumference of said sleeve such that the plane defined by each ring is perpendicular to the longitudinal axis of said sleeve and separated by a preset distance $D_P$ as measured parallel to the longitudinal axis of said sleeve and further from the mouth of said gun barrel than the last of said oblique rings, wherein the value of $D_P$ correlates with at least one predetermined parameter to a predetermined protocol.

18. The system according to claim 17, wherein said predetermined parameter is chosen from the group consisting of elevation, azimuth, distance to target, target latitude, target longitude, target elevation, amount of charge, and any combination of the above.

19. The system according to claim 1, further comprising at least one device responsive to acceleration, said device disposed within said projectile and in electrical communication with said microprocessor.

20. The system according to claim 1, wherein said projectile further comprises drag control means, said drag control means comprising:
a secondary charge;
a reversibly openable iris;

means for opening and closing said iris, said means disposed within said projectile and in mechanical connection with said iris; and, control means for controlling, according to a predetermined protocol, the degree to which said iris is opened, said control means in logical connection with said means for opening and closing said iris.

21. The system according to claim 1, wherein said projectile further comprises an inertial navigation system, said inertial navigation system comprising:
at least one gyroscope;
at least one accelerometer in electrical connection with said microprocessor; and,
at least one additional magnetic sensor in electrical connection with said microprocessor;
wherein said microprocessor is further programmed to provide control signals to the servo electronics of said inertial navigation system in response to signals received by said microprocessor inertial navigation system, whereby the trajectory of said projectile.

22. The system according to claim 21, wherein said projectile comprises a plurality of fins, and said inertial navigation system further comprises a power source and servo system for controlling the orientation of each of said fins.

23. The system according to claim 22, wherein said microprocessor is further programmed to activate a predetermined subset of the onboard components only when the acceleration of said projectile rising above a predetermined value.

24. A method for determining the values of parameters related to the linear and angular motions of a projectile exiting a gun barrel, comprising:
obtaining a system according to claim 1;
firing said projectile;
determining the time $t_0$ at which said projectile passes through said first horizontal ring;
determining the time $t_1$ at which said projectile passes through said second horizontal ring;
calculating the linear muzzle velocity V of said projectile;
calculating the time $t_2$ at which said projectile passes through distance $D_2$;
determining the time $t_3$ at which said magnetic sensor crosses the first of said plurality of oblique rings;
defining a reference point $P_1$ along the circumference of said sleeve;
determining the crossing point $P_2$ on the first of said oblique rings;
calculating a chord $Y_1$, wherein $Y_1$ is defined as the distance, measured in a plane containing point $P_2$ and perpendicular to the longitudinal axis of said sleeve, between $P_2$ and the intersection of a perpendicular drawn from $P_1$ to said plane;
calculating roll state angle $\phi_1$ subtended by said chord $Y_1$;
calculating the time $t_4$ at which said projectile passes through distance $D_2+\Delta D_m$ for a predetermined integral value of m, $1 \leq m \leq n-1$;
determining the time $t_5$ at which said magnetic sensor crosses the (m+1)th of said oblique rings;
defining a reference point $P_3$ along the circumference of said sleeve, wherein the angle between $P_3$ and $P_1$ with respect to the longitudinal axis of said sleeve is $\zeta$;
determining the crossing point $P_4$ on said (m+1)th of said oblique rings;
calculating a chord $Y_2$, wherein $Y_2$ is defined as the distance, measured in a plane containing point $P_4$ and perpendicular to the longitudinal axis of said sleeve, between $P_4$ and the intersection of a perpendicular drawn from $P_3$ to said plane;
calculating roll state angle $\phi_2$ subtended by said chord $Y_2$; and,
calculating the angular velocity $V_{ang}$ of said projectile.

25. The method according to claim 24, wherein said system comprises n oblique rings, n>2, and further comprising:
calculating the time $t_{4m}$ at which said projectile passes through distance $D_2+(m-1)\Delta D$, wherein m is an integer greater than 1 and less than or equal to n and $\Delta D$ is the distance between two successive oblique rings, as measured along the longitudinal axis of said sleeve;
determining the time $t_{5m}$ at which said magnetic sensor crosses the mth oblique third ring;
defining a reference point $P_{3m}$ along the circumference of said sleeve, wherein the angle between $P_{3m}$ and $P_1$ with respect to the circumference of said sleeve is $\zeta$;
determining the crossing point $P_{4m}$ on said mth oblique third ring;
calculating a chord $Y_{2m}$, wherein $Y_{2m}$ is defined as the distance, measured in a plane containing point $P_{4m}$ and perpendicular to the longitudinal axis of said sleeve, between $P_{4m}$ and the intersection of a perpendicular drawn from $P_{3m}$ to said plane;
calculating roll state angle $\phi_2$ subtended by said chord $Y_{2m}$; and, calculating the angular velocity $V_{ang}$ of said projectile.

26. The method according to claim 24, wherein $\zeta=0$.

27. The method according to claim 24, wherein p>1 and further comprising a step of carrying out each of the steps said method independently for each of said p magnetic sensors.

28. The method according to claim 27, further comprising a step of performing a redundancy check by using said microprocessor to compare the p values obtained for V and for $V_{ang}$.

29. The method according to claim 27, further comprising steps of:
averaging at least a subset of the p values obtained for V and for $V_{ang}$; and,
defining the averages thus obtained to be the nominal values of V and $V_{ang}$.

30. The method according to claim 24, further comprising steps of:
defining $r_{ring}$ as the radius of the oblique rings;
defining $D_3$ as the distance, measured along the longitudinal axis of said sleeve, between points $P_1$ and $P_2$;
defining $D_4$ as the distance, measured along the longitudinal axis of said sleeve, between said first horizontal ring and point $P_3$; and,
defining $D_5$ as the distance, measured along the longitudinal axis of said sleeve, between points $P_3$ and $P_4$;
wherein
said step of calculating V further includes a step of calculating V from the relation $$V = \frac{D_1}{t_1 - t_0};$$

said step of calculating $Y_1$ further includes a step of calculating $Y_1$ from the relation $$Y_1 = \frac{D_3}{\tan\theta};$$

said step of calculating $\phi_1$ further includes a step of calculating $\phi_1$ from the relation $$\varphi_1 = \cos^{-1}\left[\left(\frac{Y_1}{2r_{ring}}\right)^2 + 1\right];$$

said step of calculating $Y_2$ further includes a step of calculating $Y_2$ from the relation $$Y_2 = \frac{D_5}{\tan\theta};$$

said step of calculating $\phi_2$ further includes a step of calculating $\phi_1$ from the relation $$\varphi_2 = \cos^{-1}\left[\left(\frac{Y_2}{2r_{ring}}\right)^2 + 1\right];$$

and,
said step of calculating the angular velocity further includes a step of calculating the angular velocity from the relation $$V_{ang} = \frac{\varphi_2 - \varphi_1 + \zeta}{t_5 - t_3}.$$

31. The method according to claim 30, wherein said step of calculating the time $t_2$ at which said projectile passes through distance $D_2$ further includes a step of calculating $t_2$ from the relation $D_2=V(t_2-t_0)$, said step of calculating the time $t_4$ at which said projectile passes through distance $D_4$ further includes a step of calculating $t_4$ from the relation $D_4=V(t_4-t_0)$, and further comprising:
calculating the distance $D_3$ from the relation $D_3=V(t_3-t_2)$; and,
calculating the distance $D_5$ from the relation $D_5=V(t_5-t_4)$.

32. The method according to claim 24, further comprising:
disposing a third horizontal ring constructed of magnetic material about the circumference of said sleeve such that the plane defined by said third horizontal ring is perpendicular to the longitudinal axis of said sleeve and displaced from said first horizontal ring by a distance $D_A$ as measured along the longitudinal axis of said sleeve;
determining the time $t_4$ at which said magnetic sensor crosses said third horizontal ring; and,
determining the linear acceleration A of said projectile.

33. The method according to claim 24, further comprising:
disposing a third horizontal ring constructed of magnetic material about the circumference of said sleeve such that the plane defined by said third horizontal ring is perpendicular to the longitudinal axis of said sleeve and displaced from said first horizontal ring by a distance $D_A$ as measured along the longitudinal axis of said sleeve;
determining the time $t_4$ at which said magnetic sensor crosses said third horizontal ring;
calculating V' from the relation $$V' = \frac{D_A}{t_A - t_1};$$

and,
determining the linear acceleration A of said projectile from the relation $$A = \frac{V' - V}{t_A - t_0}.$$

34. The method according to claim 25, further comprising:
calculating the time $t_{4m}'$ at which said projectile passes through distance $D_2 + \Delta D_m$, $m<m'<n-2$;
determining the time $t_{5m}'$ at which said magnetic sensor crosses the (m')th oblique ring;
defining a reference point $P_{3m}'$ along the circumference of said sleeve, wherein the angle between $P_{3m}'$ and $P_1$ with respect to the circumference of said sleeve is $\zeta'$;
determining the crossing point $P_{4m}'$ on said (m')th oblique ring;
calculating a chord $Y_{2m}'$, wherein $Y_{2m}'$ is defined as the distance, measured in a plane containing point $P_{4m}'$ and perpendicular to the longitudinal axis of said sleeve, between $P_{4m}'$ and the intersection of a perpendicular drawn from $P_{3m}'$ to said plane;
calculating roll state angle $\phi_3$ subtended by said chord $Y_{2m}'$; and,
calculating the angular acceleration $A_{ang}$ of said projectile.

35. The method according to claim 34, further comprising calculating $$V'_{ang} = \frac{\varphi_3 - \varphi_2}{t'_{5m} - t_5},$$

wherein said step of calculating the angular acceleration $A_{ang}$ further comprises a step of calculating $A_{ang}$ from the relation $$A_{ang} = \frac{V'_{ang} - V_{ang}}{t'_{5m} - t_3}.$$

36. The method according to claim 24, further comprising waiting for a period of time of not less than $t_{wait}$ after said step of determining $t_2$ before performing said step of determining $t_5$, wherein $$t_{wait} = \frac{2r_{ring}\tan\theta}{V}.$$

37. The method according to claim 24, further comprising:
disposing two rings constructed of magnetic material about the circumference of said sleeve such that the plane defined by the ring is perpendicular to the longitudinal axis of said sleeve and located beyond the mouth of said gun barrel, said two rings separated by a distance $D_P$ as measured parallel to the longitudinal axis of said sleeve and disposed about said sleeve further from the mouth of said gun barrel than the furthest of said oblique rings;

setting $D_P$ to a value correlating with a predetermined parameter according to a predetermined protocol;

determining the time $t_P$ for said magnetic sensor to traverse said two rings;

calculating $D_P$ from the relation $$D_P = \frac{V}{t_P};$$

and, determining the value of said parameter according to said predetermined protocol.

38. The method according to claim 37, wherein said parameter is chosen from the group consisting of elevation, azimuth, distance to target, target latitude, target longitude, target elevation, amount of charge, and any combination of the above.

39. The method according to claim 24, further comprising:
obtaining an inertial navigation system comprising:
at least one gyroscope;
at least one accelerometer in electrical connection with said microprocessor; and,
at least one additional magnetic sensor in electrical connection with said microprocessor;
and,
directing the inertial navigation system to correct the trajectory of said projectile in response to the values of V and $V_{ang}$.

40. The method according to claim 39, further comprising:
obtaining a projectile further comprising a plurality of fins; and,
obtaining an inertial navigation system further comprising a power source and servo system for controlling the orientation of each of said fins;
wherein said step of directing the inertial navigation system to correct the trajectory of said projectile in response to the values of V and $V_{ang}$ further comprises a step of using said servo system to control the orientation of each of said fins in order to correct the trajectory of said projectile.

41. The method according to claim 39, further comprising activating a predetermined subset of the onboard components only when the acceleration of said projectile falls below a predetermined value.

42. The method according to claim 24, further comprising:
obtaining an inertial navigation system according to claim 21;
disposing said inertial navigation system within said projectile such that said inertial navigation system can be used to direct the navigation of said projectile;
using the navigation software of said inertial navigation system to combine the preloaded parameters with the, muzzle angular position, the linear velocity V and the angular velocity $V_{ang}$; and,
directing the inertial navigation software system to correct the trajectory of said projectile in response to the values inserted and/or measured.

43. The method according to claim 24, further comprising: supplying data from an external source to said microprocessor; storing said externally supplied data.

44. The method according to claim 43, wherein said externally supplied data is chosen from the group consisting of the amount of charge; location of said gun barrel; azimuth; attitude; target location; expected target range; magnetic grid type; parameters related to current weather conditions; parameters related to predicted future weather conditions; parameters related to climate; and any combination of the above.

45. The method according to claim 24, further comprising:
disposing two rings constructed of magnetic material about the circumference of said sleeve such that the plane defined by the ring is perpendicular to the longitudinal axis of said sleeve and located beyond the mouth of said gun barrel, said two rings separated by a distance $D_P$ as measured parallel to the longitudinal axis of said sleeve and disposed about said sleeve further from the mouth of said gun barrel than the furthest of said oblique rings;
measuring the time $t_p$ for said magnetic sensor to traverse send two rings separated by a distance $D_P$; and,
calculating the linear velocity V' from the relation $$V' = \frac{D_P}{t_P}.$$

46. The method according to claim 24, further comprising:
obtaining a projectile according to claim 20;
firing said secondary charge; and,
controlling the drag of said projectile by opening said iris to the degree required to bring the projectile's drag to a predetermined value.

* * * * *